US008549305B2

(12) United States Patent
Moskowitz et al.

(10) Patent No.: US 8,549,305 B2
(45) Date of Patent: *Oct. 1, 2013

(54) STEGANOGRAPHIC METHOD AND DEVICE

(75) Inventors: Scott Moskowitz, Sunny Isles Beach, FL (US); Marc Cooperman, Short Hills, NJ (US)

(73) Assignee: Wistaria Trading, Inc., Sunny Isles Beach, FL (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/913,751

(22) Filed: Oct. 27, 2010

(65) Prior Publication Data

US 2011/0069864 A1 Mar. 24, 2011

Related U.S. Application Data

(60) Continuation of application No. 11/894,443, filed on Aug. 21, 2007, now Pat. No. 7,870,393, which is a continuation of application No. 08/999,766, filed on Jul. 23, 1997, now Pat. No. 7,568,100, which is a division of application No. 08/775,216, filed on Dec. 31, 1996, now Pat. No. 5,687,236, which is a continuation of application No. 08/489,172, filed on Jun. 7, 1995, now Pat. No. 5,613,004.

(51) Int. Cl.
*H04L 9/32* (2006.01)
*H04L 9/00* (2006.01)
*H04L 9/28* (2006.01)
*H04K 1/00* (2006.01)

(52) U.S. Cl.
USPC .............................................. 713/176; 380/28

(58) Field of Classification Search
USPC .............................................. 380/28; 713/176
See application file for complete search history.

(56) References Cited

U.S. PATENT DOCUMENTS

| | | | |
|---|---|---|---|
| 3,947,825 A | 3/1976 | Cassada |
| 3,984,624 A | 10/1976 | Waggener |
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,390,898 A | 6/1983 | Bond et al. |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |
| 4,748,668 A | 5/1988 | Shamir et al. |
| 4,789,928 A | 12/1988 | Fujisaki |
| 4,827,508 A | 5/1989 | Shear |
| 4,876,617 A | 10/1989 | Best et al. |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Jones et al. |
| 4,972,471 A | 11/1990 | Gross et al. |
| 4,977,594 A | 12/1990 | Shear |
| 4,979,210 A | 12/1990 | Nagata et al. |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,113,437 A | 5/1992 | Best et al. |
| 5,136,581 A | 8/1992 | Muehrcke |
| 5,136,646 A | 8/1992 | Haber et al. |
| 5,136,647 A | 8/1992 | Haber et al. |
| 5,142,576 A | 8/1992 | Nadan |
| 5,161,210 A | 11/1992 | Druyvesteyn et al. |
| 5,210,820 A | 5/1993 | Kenyon |
| 5,243,423 A | 9/1993 | DeJean et al. |
| 5,243,515 A | 9/1993 | Lee |
| 5,287,407 A | 2/1994 | Holmes |
| 5,319,735 A | 6/1994 | Preuss et al. |
| 5,341,429 A | 8/1994 | Stringer et al. |
| 5,341,477 A | 8/1994 | Pitkin et al. |
| 5,363,448 A | 11/1994 | Koopman et al. |
| 5,365,586 A | 11/1994 | Indeck et al. |
| 5,369,707 A | 11/1994 | Follendore, III |
| 5,379,345 A | 1/1995 | Greenberg |
| 5,394,324 A | 2/1995 | Clearwater |
| 5,398,285 A | 3/1995 | Borgelt et al. |

(Continued)

FOREIGN PATENT DOCUMENTS

| | | |
|---|---|---|
| EP | 0372601 | 6/1990 |
| EP | 0565947 | 10/1993 |

(Continued)

OTHER PUBLICATIONS

EPO Appplication No. 96919405.9, entitled "Steganographic Method and Device"; published as EP0872073 (A2), Oct. 21, 1998.

(Continued)

*Primary Examiner* — Kambiz Zand
*Assistant Examiner* — Benjamin Kaplan
(74) *Attorney, Agent, or Firm* — Neifeld IP Law, PC

(57) ABSTRACT

An apparatus and method for encoding and decoding additional information into a stream of digitized samples in an integral manner. The information is encoded using special keys. The information is contained in the samples, not prepended or appended to the sample stream. The method makes it extremely difficult to find the information in the samples if the proper keys are not possessed by the decoder. The method does not cause a significant degradation to the sample stream. The method is used to establish ownership of copyrighted digital multimedia content and provide a disincentive to piracy of such material.

54 Claims, No Drawings

(56) References Cited

U.S. PATENT DOCUMENTS

| | | |
|---|---|---|
| 5,406,627 A | 4/1995 | Thompson et al. |
| 5,408,505 A | 4/1995 | Indeck et al. |
| 5,410,598 A | 4/1995 | Shear |
| 5,412,718 A | 5/1995 | Narasimhalv et al. |
| 5,418,713 A | 5/1995 | Allen |
| 5,428,606 A | 6/1995 | Moskowitz |
| 5,450,490 A | 9/1995 | Jensen et al. |
| 5,469,536 A | 11/1995 | Blank |
| 5,471,533 A | 11/1995 | Wang et al. |
| 5,478,990 A | 12/1995 | Montanari et al. |
| 5,479,210 A | 12/1995 | Cawley et al. |
| 5,487,168 A | 1/1996 | Geiner et al. |
| 5,493,677 A | 2/1996 | Balogh et al. |
| 5,497,419 A | 3/1996 | Hill |
| 5,506,795 A | 4/1996 | Yamakawa |
| 5,513,126 A | 4/1996 | Harkins et al. |
| 5,513,261 A | 4/1996 | Maher |
| 5,530,739 A | 6/1996 | Okada |
| 5,530,751 A | 6/1996 | Morris |
| 5,530,759 A | 6/1996 | Braudaway et al. |
| 5,539,735 A | 7/1996 | Moskowitz |
| 5,548,579 A | 8/1996 | Lebrun et al. |
| 5,568,570 A | 10/1996 | Rabbani |
| 5,579,124 A | 11/1996 | Aijala et al. |
| 5,581,703 A | 12/1996 | Baugher et al. |
| 5,583,488 A | 12/1996 | Sala et al. |
| 5,598,470 A | 1/1997 | Cooper et al. |
| 5,606,609 A | 2/1997 | Houser et al. |
| 5,613,004 A | 3/1997 | Cooperman et al. |
| 5,617,119 A | 4/1997 | Briggs et al. |
| 5,625,690 A | 4/1997 | Michel et al. |
| 5,629,980 A | 5/1997 | Stefik et al. |
| 5,633,932 A | 5/1997 | Davis et al. |
| 5,634,040 A | 5/1997 | Her et al. |
| 5,636,276 A | 6/1997 | Brugger |
| 5,636,292 A | 6/1997 | Rhoads |
| 5,640,569 A | 6/1997 | Miller et al. |
| 5,646,997 A | 7/1997 | Barton |
| 5,657,461 A | 8/1997 | Harkins et al. |
| 5,659,726 A | 8/1997 | Sandford, II et al. |
| 5,664,018 A | 9/1997 | Leighton |
| 5,673,316 A | 9/1997 | Auerbach et al. |
| 5,677,952 A | 10/1997 | Blakley et al. |
| 5,680,462 A | 10/1997 | Miller et al. |
| 5,687,236 A | 11/1997 | Moskowitz et al. |
| 5,689,587 A | 11/1997 | Bender et al. |
| 5,696,828 A | 12/1997 | Koopman, Jr. |
| 5,719,937 A | 2/1998 | Warren et al. |
| 5,721,788 A | 2/1998 | Powell et al. |
| 5,734,752 A | 3/1998 | Knox |
| 5,737,416 A | 4/1998 | Cooper et al. |
| 5,737,733 A | 4/1998 | Eller |
| 5,740,244 A | 4/1998 | Indeck et al. |
| 5,745,569 A | 4/1998 | Moskowitz et al. |
| 5,748,783 A | 5/1998 | Rhoads |
| 5,751,811 A | 5/1998 | Magnotti et al. |
| 5,754,697 A | 5/1998 | Fu et al. |
| 5,757,923 A | 5/1998 | Koopman, Jr. |
| 5,765,152 A | 6/1998 | Erickson |
| 5,768,396 A | 6/1998 | Sone |
| 5,774,452 A | 6/1998 | Wolosewicz |
| 5,790,677 A | 8/1998 | Fox et al. |
| 5,799,083 A | 8/1998 | Brothers et al. |
| 5,809,139 A | 9/1998 | Grirod et al. |
| 5,809,160 A | 9/1998 | Powell et al. |
| 5,818,818 A | 10/1998 | Soumiya |
| 5,822,432 A | 10/1998 | Moskowitz et al. |
| 5,828,325 A | 10/1998 | Wolosewicz et al. |
| 5,832,119 A | 11/1998 | Rhoads |
| 5,842,213 A | 11/1998 | Odom |
| 5,848,155 A | 12/1998 | Cox |
| 5,850,481 A | 12/1998 | Rhoads |
| 5,859,920 A | 1/1999 | Daly et al. |
| 5,860,099 A | 1/1999 | Milios et al. |
| 5,862,260 A | 1/1999 | Rhoads |
| 5,870,474 A | 2/1999 | Wasilewski et al. |
| 5,884,033 A | 3/1999 | Duvall et al. |
| 5,889,868 A | 3/1999 | Moskowitz et al. |
| 5,893,067 A | 4/1999 | Bender et al. |
| 5,894,521 A | 4/1999 | Conley |
| 5,903,721 A | 5/1999 | Sixtus |
| 5,905,800 A | 5/1999 | Moskowitz et al. |
| 5,905,975 A | 5/1999 | Ausubel |
| 5,912,972 A | 6/1999 | Barton |
| 5,915,027 A | 6/1999 | Cox et al. |
| 5,917,915 A | 6/1999 | Hirose |
| 5,918,223 A | 6/1999 | Blum |
| 5,920,900 A | 7/1999 | Poole et al. |
| 5,923,763 A | 7/1999 | Walker et al. |
| 5,930,369 A | 7/1999 | Cox et al. |
| 5,930,377 A | 7/1999 | Powell et al. |
| 5,940,134 A | 8/1999 | Wirtz |
| 5,943,422 A | 8/1999 | Van Wie et al. |
| 5,949,055 A | 9/1999 | Fleet |
| 5,963,909 A | 10/1999 | Warren et al. |
| 5,973,731 A | 10/1999 | Schwab |
| 5,974,141 A | 10/1999 | Saito |
| 5,991,426 A | 11/1999 | Cox et al. |
| 5,999,217 A | 12/1999 | Berners-Lee |
| 6,009,176 A | 12/1999 | Gennaro et al. |
| 6,029,126 A | 2/2000 | Malvar |
| 6,041,316 A | 3/2000 | Allen |
| 6,044,471 A | 3/2000 | Colvin |
| 6,049,838 A | 4/2000 | Miller et al. |
| 6,051,029 A | 4/2000 | Paterson et al. |
| 6,061,793 A | 5/2000 | Tewfik et al. |
| 6,067,622 A | 5/2000 | Moore |
| 6,069,914 A | 5/2000 | Cox |
| 6,078,664 A | 6/2000 | Moskowitz et al. |
| 6,081,251 A | 6/2000 | Sakai et al. |
| 6,081,587 A | 6/2000 | Reyes et al. |
| 6,081,597 A | 6/2000 | Hoffstein |
| 6,088,455 A | 7/2000 | Logan et al. |
| 6,131,162 A | 10/2000 | Yoshiura et al. |
| 6,141,753 A | 10/2000 | Zhao et al. |
| 6,141,754 A | 10/2000 | Choy |
| 6,148,333 A | 11/2000 | Guedalia |
| 6,154,571 A | 11/2000 | Cox et al. |
| 6,192,138 B1 | 2/2001 | Yamadaji |
| 6,199,058 B1 | 3/2001 | Wong et al. |
| 6,205,249 B1 | 3/2001 | Moskowitz |
| 6,208,745 B1 | 3/2001 | Florencio et al. |
| 6,226,618 B1 | 5/2001 | Downs |
| 6,230,268 B1 | 5/2001 | Miwa et al. |
| 6,233,347 B1 | 5/2001 | Chen et al. |
| 6,233,684 B1 | 5/2001 | Stefik et al. |
| 6,240,121 B1 | 5/2001 | Senoh |
| 6,263,313 B1 | 7/2001 | Milstead et al. |
| 6,272,634 B1 | 8/2001 | Tewfik et al. |
| 6,275,988 B1 | 8/2001 | Nagashima et al. |
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |
| 6,330,335 B1 | 12/2001 | Rhoads |
| 6,330,672 B1 | 12/2001 | Shur |
| 6,345,100 B1 | 2/2002 | Levine |
| 6,351,765 B1 | 2/2002 | Pietropaolo et al. |
| 6,363,483 B1 | 3/2002 | Keshav |
| 6,373,892 B1 | 4/2002 | Ichien et al. |
| 6,373,960 B1 | 4/2002 | Conover et al. |
| 6,374,036 B1 | 4/2002 | Ryan et al. |
| 6,377,625 B1 | 4/2002 | Kim |
| 6,381,618 B1 | 4/2002 | Jones et al. |
| 6,381,747 B1 | 4/2002 | Wonfor et al. |
| 6,385,324 B1 | 5/2002 | Koppen |
| 6,385,329 B1 | 5/2002 | Sharma et al. |
| 6,385,596 B1 | 5/2002 | Wiser |
| 6,389,538 B1 | 5/2002 | Gruse et al. |
| 6,405,203 B1 | 6/2002 | Collart |
| 6,415,041 B1 | 7/2002 | Oami et al. |

| | | | | | | |
|---|---|---|---|---|---|---|
| 6,418,421 B1 | 7/2002 | Hurtado | 7,206,649 B2 | 4/2007 | Kirovski et al. |
| 6,425,081 B1 | 7/2002 | Iwamura | 7,231,524 B2 | 6/2007 | Burns |
| 6,430,301 B1 | 8/2002 | Petrovic | 7,233,669 B2 | 6/2007 | Candelore |
| 6,430,302 B2 | 8/2002 | Rhoads | 7,240,210 B2 | 7/2007 | Michak et al. |
| 6,442,283 B1 | 8/2002 | Tewfik et al. | 7,266,697 B2 | 9/2007 | Kirovski et al. |
| 6,446,211 B1 | 9/2002 | Colvin | 7,286,451 B2 | 10/2007 | Wirtz |
| 6,453,252 B1 | 9/2002 | Laroche | 7,287,275 B2 | 10/2007 | Moskowitz |
| 6,457,058 B1 | 9/2002 | Ullum et al. | 7,289,643 B2 | 10/2007 | Brunk et al. |
| 6,463,468 B1 | 10/2002 | Buch et al. | 7,343,492 B2 | 3/2008 | Moskowitz et al. |
| 6,484,264 B1 | 11/2002 | Colvin | 7,346,472 B1 | 3/2008 | Moskowitz et al. |
| 6,493,457 B1 | 12/2002 | Quackenbush | 7,362,775 B1 | 4/2008 | Moskowitz |
| 6,502,195 B1 | 12/2002 | Colvin | 7,363,278 B2 | 4/2008 | Schmelzer et al. |
| 6,522,767 B1 | 2/2003 | Moskowitz et al. | 7,409,073 B2 | 8/2008 | Moskowitz et al. |
| 6,522,769 B1 | 2/2003 | Rhoads et al. | 7,457,962 B2 | 11/2008 | Moskowitz |
| 6,523,113 B1 | 2/2003 | Wehrenberg | 7,460,994 B2 | 12/2008 | Herre et al. |
| 6,530,021 B1 | 3/2003 | Epstein et al. | 7,475,246 B1 | 1/2009 | Moskowitz |
| 6,532,284 B2 | 3/2003 | Walker et al. | 7,530,102 B2 | 5/2009 | Moskowitz |
| 6,539,475 B1 | 3/2003 | Cox et al. | 7,532,725 B2 | 5/2009 | Moskowitz et al. |
| 6,557,103 B1 | 4/2003 | Boncelet, Jr. et al. | 7,568,100 B1 | 7/2009 | Moskowitz et al. |
| 6,584,125 B1 | 6/2003 | Katto | 7,647,502 B2 | 1/2010 | Moskowitz |
| 6,587,837 B1 | 7/2003 | Spagna et al. | 7,647,503 B2 | 1/2010 | Moskowitz |
| 6,590,996 B1 | 7/2003 | Reed | 7,664,263 B2 | 2/2010 | Moskowitz |
| 6,598,162 B1 | 7/2003 | Moskowitz | 7,743,001 B1 | 6/2010 | Vermeulen |
| 6,606,393 B1 | 8/2003 | Xie et al. | 7,761,712 B2 | 7/2010 | Moskowitz |
| 6,611,599 B2 | 8/2003 | Natarajan | 7,779,261 B2 | 8/2010 | Moskowitz |
| 6,647,424 B1 | 11/2003 | Pearson et al. | 2001/0010078 A1 | 7/2001 | Moskowitz |
| 6,658,010 B1 | 12/2003 | Enns et al. | 2001/0029580 A1 | 10/2001 | Moskowitz |
| 6,665,489 B2 | 12/2003 | Collart | 2001/0043594 A1 | 11/2001 | Ogawa et al. |
| 6,668,246 B1 | 12/2003 | Yeung et al. | 2002/0009208 A1 | 1/2002 | Alattar |
| 6,668,325 B1 | 12/2003 | Collberg et al. | 2002/0010684 A1 | 1/2002 | Moskowitz |
| 6,674,858 B1 | 1/2004 | Kimura | 2002/0026343 A1 | 2/2002 | Duenke |
| 6,687,683 B1 | 2/2004 | Harada et al. | 2002/0056041 A1 | 5/2002 | Moskowitz |
| 6,725,372 B1 | 4/2004 | Lewis et al. | 2002/0071556 A1 | 6/2002 | Moskowitz et al. |
| 6,754,822 B1 | 6/2004 | Zhao | 2002/0073043 A1 | 6/2002 | Herman et al. |
| 6,775,772 B1 | 8/2004 | Binding et al. | 2002/0097873 A1 | 7/2002 | Petrovic |
| 6,784,354 B1 | 8/2004 | Lu et al. | 2002/0103883 A1 | 8/2002 | Haverstock et al. |
| 6,785,815 B1 | 8/2004 | Serret-Avila et al. | 2002/0161741 A1 | 10/2002 | Wang et al. |
| 6,785,825 B2 | 8/2004 | Colvin | 2003/0002862 A1 | 1/2003 | Rodriguez |
| 6,792,548 B2 | 9/2004 | Colvin | 2003/0126445 A1 | 7/2003 | Wehrenberg |
| 6,792,549 B2 | 9/2004 | Colvin | 2003/0133702 A1 | 7/2003 | Collart |
| 6,795,925 B2 | 9/2004 | Colvin | 2003/0200439 A1 | 10/2003 | Moskowitz |
| 6,799,277 B2 | 9/2004 | Colvin | 2003/0219143 A1 | 11/2003 | Moskowitz et al. |
| 6,813,717 B2 | 11/2004 | Colvin | 2004/0028222 A1 | 2/2004 | Sewell et al. |
| 6,813,718 B2 | 11/2004 | Colvin | 2004/0037449 A1 | 2/2004 | Davis et al. |
| 6,823,455 B1 | 11/2004 | Macy et al. | 2004/0049695 A1 | 3/2004 | Choi et al. |
| 6,834,308 B1 | 12/2004 | Ikezoye et al. | 2004/0059918 A1 | 3/2004 | Xu |
| 6,842,862 B2 | 1/2005 | Chow et al. | 2004/0083369 A1 | 4/2004 | Erlingsson et al. |
| 6,853,726 B1 | 2/2005 | Moskowitz et al. | 2004/0086119 A1 | 5/2004 | Moskowitz |
| 6,857,078 B2 | 2/2005 | Colvin | 2004/0093521 A1 | 5/2004 | Hamadeh et al. |
| 6,865,747 B1 | 3/2005 | Mercier | 2004/0117628 A1 | 6/2004 | Colvin |
| 6,931,534 B1 | 8/2005 | Jandel et al. | 2004/0117664 A1 | 6/2004 | Colvin |
| 6,957,330 B1 | 10/2005 | Hughes | 2004/0125983 A1 | 7/2004 | Reed et al. |
| 6,966,002 B1 | 11/2005 | Torrubia-Saez | 2004/0128514 A1 | 7/2004 | Rhoads |
| 6,968,337 B2 | 11/2005 | Wold | 2004/0225894 A1 | 11/2004 | Colvin |
| 6,977,894 B1 | 12/2005 | Achilles et al. | 2004/0243540 A1 | 12/2004 | Moskowitz et al. |
| 6,978,370 B1 | 12/2005 | Kocher | 2005/0135615 A1 | 6/2005 | Moskowitz et al. |
| 6,986,063 B2 | 1/2006 | Colvin | 2005/0160271 A9 | 7/2005 | Brundage et al. |
| 6,990,453 B2 | 1/2006 | Wang | 2005/0177727 A1 | 8/2005 | Moskowitz et al. |
| 7,007,166 B1 | 2/2006 | Moskowitz et al. | 2005/0246554 A1 | 11/2005 | Batson |
| 7,020,285 B1 | 3/2006 | Kirovski et al. | 2006/0005029 A1 | 1/2006 | Petrovic et al. |
| 7,035,049 B2 | 4/2006 | Yamamoto | 2006/0013395 A1 | 1/2006 | Brundage et al. |
| 7,035,409 B1 | 4/2006 | Moskowitz | 2006/0013451 A1 | 1/2006 | Haitsma |
| 7,043,050 B2 | 5/2006 | Yuval | 2006/0041753 A1 | 2/2006 | Haitsma |
| 7,046,808 B1 | 5/2006 | Metois et al. | 2006/0101269 A1 | 5/2006 | Moskowitz et al. |
| 7,050,396 B1 | 5/2006 | Cohen et al. | 2006/0140403 A1 | 6/2006 | Moskowitz |
| 7,051,208 B2 | 5/2006 | Venkatesan et al. | 2006/0251291 A1 | 11/2006 | Rhoads |
| 7,058,570 B1 | 6/2006 | Yu et al. | 2006/0285722 A1 | 12/2006 | Moskowitz et al. |
| 7,093,295 B1 | 8/2006 | Saito | 2007/0011458 A1 | 1/2007 | Moskowitz |
| 7,095,874 B2 | 8/2006 | Moskowitz et al. | 2007/0028113 A1 | 2/2007 | Moskowitz |
| 7,103,184 B2 | 9/2006 | Jian | 2007/0064940 A1 | 3/2007 | Moskowitz et al. |
| 7,107,451 B2 | 9/2006 | Moskowitz | 2007/0079131 A1 | 4/2007 | Moskowitz et al. |
| 7,123,718 B1 | 10/2006 | Moskowitz et al. | 2007/0083467 A1 | 4/2007 | Lindahl et al. |
| 7,127,615 B2 | 10/2006 | Moskowitz | 2007/0110240 A1 | 5/2007 | Moskowitz et al. |
| 7,150,003 B2 | 12/2006 | Naumovich et al. | 2007/0113094 A1 | 5/2007 | Moskowitz et al. |
| 7,152,162 B2 | 12/2006 | Moskowitz et al. | 2007/0127717 A1 | 6/2007 | Herre et al. |
| 7,159,116 B2 | 1/2007 | Moskowitz | 2007/0226506 A1 | 9/2007 | Moskowitz |
| 7,162,642 B2 | 1/2007 | Schumann et al. | 2007/0253594 A1 | 11/2007 | Lu et al. |
| 7,177,429 B2 | 2/2007 | Moskowitz et al. | 2007/0294536 A1 | 12/2007 | Moskowitz et al. |
| 7,177,430 B2 | 2/2007 | Kim | 2007/0300072 A1 | 12/2007 | Moskowitz |

| | | |
|---|---|---|
| 2007/0300073 A1 | 12/2007 | Moskowitz |
| 2008/0005571 A1 | 1/2008 | Moskowitz |
| 2008/0005572 A1 | 1/2008 | Moskowitz |
| 2008/0016365 A1 | 1/2008 | Moskowitz |
| 2008/0022113 A1 | 1/2008 | Moskowitz |
| 2008/0022114 A1 | 1/2008 | Moskowitz |
| 2008/0028222 A1 | 1/2008 | Moskowitz |
| 2008/0046742 A1 | 2/2008 | Moskowitz |
| 2008/0075277 A1 | 3/2008 | Moskowitz et al. |
| 2008/0109417 A1 | 5/2008 | Moskowitz |
| 2008/0133927 A1 | 6/2008 | Moskowitz et al. |
| 2008/0151934 A1 | 6/2008 | Moskowitz et al. |
| 2009/0037740 A1 | 2/2009 | Moskowitz |
| 2009/0089427 A1 | 4/2009 | Moskowitz et al. |
| 2009/0190754 A1 | 7/2009 | Moskowitz et al. |
| 2009/0210711 A1 | 8/2009 | Moskowitz |
| 2009/0220074 A1 | 9/2009 | Moskowitz et al. |
| 2010/0002904 A1 | 1/2010 | Moskowitz |
| 2010/0005308 A1 | 1/2010 | Moskowitz |
| 2010/0064140 A1 | 3/2010 | Moskowitz |
| 2010/0077219 A1 | 3/2010 | Moskowitz |
| 2010/0077220 A1 | 3/2010 | Moskowitz |
| 2010/0098251 A1 | 4/2010 | Moskowitz |
| 2010/0106736 A1 | 4/2010 | Moskowitz |
| 2010/0153734 A1 | 6/2010 | Moskowitz |
| 2010/0182570 A1 | 7/2010 | Matsumoto |
| 2010/0202607 A1 | 8/2010 | Moskowitz |
| 2010/0220861 A1 | 9/2010 | Moskowitz |

FOREIGN PATENT DOCUMENTS

| | | |
|---|---|---|
| EP | 0581317 | 2/1994 |
| EP | 0581317 A2 | 2/1994 |
| EP | 0649261 | 4/1995 |
| EP | 0651554 | 5/1995 |
| EP | 0872073 | 7/1996 |
| EP | 1547337 | 3/2006 |
| EP | 1354276 | 12/2007 |
| NL | 1005523 | 9/1998 |
| WO | WO 9514289 | 5/1995 |
| WO | WO 9629795 | 9/1996 |
| WO | WO 9642151 | 12/1996 |
| WO | WO9701892 | 1/1997 |
| WO | WO9726733 | 1/1997 |
| WO | WO 9724833 | 7/1997 |
| WO | WO9726732 | 7/1997 |
| WO | WO 9744736 | 11/1997 |
| WO | WO 98/02864 | 1/1998 |
| WO | WO9802864 | 1/1998 |
| WO | WO9837513 | 8/1998 |
| WO | WO 9952271 | 10/1999 |
| WO | WO 9962044 | 12/1999 |
| WO | WO 9963443 | 12/1999 |
| WO | WO 0057643 | 9/2000 |
| WO | WO0118628 | 3/2001 |
| WO | WO0143026 | 6/2001 |
| WO | WO0203385 | 1/2002 |
| WO | WO02003385 A1 | 10/2002 |

OTHER PUBLICATIONS

Jap. App. No. 2000-542907, entitled "Multiple Transform Utilization and Application for Secure Digital Watermarking"; which is a JP national stage of PCT/US1999/007262, published as WO/1999/052271, Oct. 14, 1999.
PCT Application No. PCT/US00/21189, filed Aug. 4, 2000, entitled, "A Secure Personal Content Server", Pub. No. WO/2001/018628 ; Publication Date: Mar. 15, 2001.
Schneier, Bruce, Applied Cryptography, 2nd Ed., John Wiley & Sons, pp. 9-10, 1996.
Menezes, Alfred J., Handbook of Applied Cryptography, CRC Press, p. 46, 1997.
Merriam-Webster's Collegiate Dictionary, 10th Ed., Merriam Webster, Inc., p. 207.
Brealy, et al., Principles of Corporate Finance, "Appendix A—Using Option Valuation Models", 1984, pp. 448-449.
Copeland, et al., Real Options: A Practitioner's Guide, 2001 pp. 106-107, 201-202, 204-208.
Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html on.
Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.
Low, S.H., "Equilibrium Allocation and Pricing of Variable Resources Among User-Suppliers", 1988. http://www.citesear.nj.nec.com/366503.html.
Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.
Zhao, Jian. "A WWW Service to Embed and Prove Digital Copyright Watermarks", Proc. of the European conf. on Multimedia Applications, Services & Techniques Louvain-La-Nevve Belgium May 1996.
Gruhl, Daniel et al., Echo Hiding. In Proceeding of the Workshop on Information Hiding. No. 1174 in Lecture Notes in Computer Science, Cambridge, England (May/Jun. 1996).
Oomen, A.W.J. et al., A Variable Bit Rate Buried Data Channel for Compact Disc, J.AudioEng. Sc., vol. 43, No. 1/2, pp. 23-28 (1995).
Ten Kate, W. et al., A New Surround-Stereo-Surround Coding Techniques, J. Audio Eng.Soc., vol. 40,No. 5,pp. 376-383 (1992).
Gerzon, Michael et al., A High Rate Buried Data Channel for Audio CD, presentation notes, Audio Engineering Soc. 94th Convention (1993).
Sklar, Bernard, Digital Communications, pp. 601-603 (1988).
Jayant, N.S. et al., Digital Coding of Waveforms, Prentice Hall Inc., Englewood Cliffs, NJ, pp. 486-509 (1984).
Bender, Walter R. et al., Techniques for Data Hiding, SPIE Int. Soc. Opt. Eng., vol. 2420, pp. 164-173, 1995.
Zhao, Jian et al., Embedding Robust Labels into Images for Copyright Protection, (xp 000571976), pp. 242-251, 1995.
Menezes, Alfred J., Handbook of Applied Cryptography, CRC Press, p. 175, 1997.
Schneier, Bruce, Applied Cryptography, 1st Ed., pp. 67-68, 1994.
Ten Kate, W. et al., "Digital Audio Carrying Extra Information", IEEE, CH 2847-2/90/0000-1097, (1990).
Van Schyndel, et al., "A digital Watermark," IEEE Int'l Computer Processing Conference, Austin,TX, Nov. 13-16, 1994, pp. 86-90.
Smith, et al. "Modulation and Information Hiding in Images", Springer Verlag, 1st Int'l Workshop, Cambridge, UK, May 30-Jun. 1, 1996, pp. 207-227.
1997, Kutter, Martin et al., "Digital Signature of Color Images Using Amplitude Modulation", SPIE-E197, vol. 3022, pp. 518-527.
Puate, Joan et al., "Using Fractal Compression Scheme to Embed a Digital Signature into an Image", SPIE-96 Proceedings, vol. 2915, Mar. 1997, pp. 108-118.
Swanson, Mitchell D.,et al., "Transparent Robust Image Watermarking", Proc. of the 1996 IEEE Int'l Conf. on Image Processing, vol. 111, 1996 , pp. 211-214.
Swanson, Mitchell D., et al. "Robust Data Hiding for Images", 7th IEEE Digital Signal Processing Workshop, Leon, Norway. Sep. 1-4, 1996, pp. 37-40.
Date Unknown, Zhao, Jian et al., "Embedding Robust Labels into Images for Copyright Protection", Proceeding of the Know Right '95 Conference, pp. 242-251.
Koch, E., et al., "Towards Robust and Hidden Image Copyright Labeling", 1995 IEEE Workshop on Nonlinear Signal and Image Processing, Jun. 1995 Neos Marmaras pp. 4.
Van Schyandel, et al., "Towards a Robust Digital Watermark", Second Asain Image Processing Conference, Dec. 6-8, 1995, Singapore, vol. 2, pp. 504-508.
Tirkel,A.Z., "A Two-Dimensional Digital Watermark", DICTA '95, Univ. of Queensland, Brisbane, Dec. 5-8, 1995, pp. 7.
Tirkel,A.Z., "Image Watermarking—A Spread Spectrum Application", ISSSTA '96, Sep. 1996, Mainz, German, pp. 6.
O'Ruanaidh, et al. "Watermarking Digital Images for Copyright Protection", IEEE Proceedings, vol. 143, No. 4, Aug. 1996, pp. 250-256.

Date Unknown, Cox, et al., Secure Spread Spectrum Watermarking for Multimedia, NEC Research Institute, Techinal Report 95-10, pp. 33.

Kahn, D., "The Code Breakers", The MacMillan Company, 1969, pp. xIII, 81-83, 513, 515, 522-526, 863.

Boney, et al., Digital Watermarks for Audio Signals, EVSIPCO, 96, pp. 473-480 (Mar. 14, 1997).

Dept. of Electrical Engineering, Del Ft University of Technology, Del ft The Netherlands, Cr.C. Langelaar et al.,"Copy Protection for Multimedia Data based on Labeling Techniques", Jul. 1996 9 pp.

Date Unknown, F. Hartung, et al., "Digital Watermarking of Raw and Compressed Video", SPIE vol. 2952, pp. 205-213.

Craver, et al., "Can Invisible Watermarks Resolve Rightful Ownerships?", IBM Research Report, RC 20509 (Jul. 25, 1996) 21 pp.

Press, et al., "Numerical Recipes in C", Cambridge Univ. Press, 1988, pp. 398-417.

Pohlmann, Ken C., "Principles of Digital Audio", 3rd Ed., 1995, pp. 32-37, 40-48:138, 147-149, 332, 333, 364, 499-501, 508-509, 564-571.

Pohlmann, Ken C., "Principles of Digital Audio", 2nd Ed., 1991, pp. 1-9, 19-25, 30-33, 41-48, 54-57, 86-107, 375-387.

Schneier, Bruce, Applied Cryptography, John Wiley & Sons, Inc., New York, 1994, pp. 68, 69, 387-392, 1-57, 273-275, 321-324.

Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.

Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).

Rivest, et al., "Pay Word and Micromint: Two Simple Micropayment Schemes," MIT Laboratory for Computer Science, Cambridge, MA, May 7, 1996 pp. 1-18.

Bender, et al., "Techniques for Data Hiding", IBM Systems Journal, (1996) vol. 35, Nos. 3 & 4, pp. 313-336.

Moskowitz, "Bandwith as Currency", IEEE Multimedia, Jan.-Mar. 2003, pp. 14-21.

Moskowitz, Multimedia Security Technologies for Digital Rights Management, 2006, Academic Press, "Introduction—Digital Rights Management" pp. 3-22.

Rivest, et al., "PayWord and Micromint: Two Simple Micropayment Schemes," MIT Laboratory for Computer Science, Cambridge, MA, Apr. 27, 2001, pp. 1-18.

Tomsich, et al., "Towards a secure and de-centralized digital watermarking infrastructure for the protection of Intellectual Property", in Electronic Commerce and Web Technologies, Proceedings (ECWEB)(2000).

Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.

Lemma, et al. "Secure Watermark Embedding through Partial Encryption", International Workshop on Digital Watermarking ("IWDW" 2006). Springer Lecture Notes in Computer Science 2006 (to appear) 13.

Kocher, et al., "Self Protecting Digital Content", Technical Report from the CRI Content Security Research Initiative, Cryptography Research, Inc. 2002-2003 14 pages.

Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.

Schunter, M. et al., "A Status Report on the SEMPER framework for Secure Electronic Commerce", Computer Networks and ISDN Systems, Sep. 30, 1998, pp. 1501-1510 vol. 30 No. 16-18 NL North Holland.

Konrad, K. et al., "Trust and Electronic Commerce—more than a technical problem," Proceedings of the 18th IEEE Symposium on Reliable Distributed Systems Oct. 19-22, 1999, pp. 360-365 Lausanne.

Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.

Steinauer D. D., et al., "Trust and Traceability in Electronic Commerce", Standard View, Sep. 1997, pp. 118-124, vol. 5 No. 3, ACM, USA.

Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.

European Search Report & European Search Opinion in EP07112420.

STAIND (The Singles 1996-2006), Warner Music—Atlantic, Pre-Release CD image, 2006, 1 page.

Radiohead ("Hail to the Thief"), EMI Music Group—Capitol, Pre-Release CD image, 2003, 1 page.

U.S. Appl. No. 60/169,274, filed Dec. 7, 1999, entitled "Systems, Methods and Devices for Trusted Transactions".

U.S. Appl. No. 60/234,199, filed Sep. 20, 2000, "Improved Security Based on Subliminal and Supraliminal Channels for Data Objects".

U.S. Appl. No. 09/671,739, filed Sep. 29, 2000, entitled "Method and Device for Monitoring and Analyzing Signals".

Tirkel, A.Z., "A Two-Dimensional Digital Watermark", Scientific Technology, 686, 14, date unknown.

PCT International Search Report in PCT/US95/08159.

PCT International Search Report in PCT/US96/10257.

Supplementary European Search Report in EP 96919405.

PCT International Search Report in PCT/US97/00651.

PCT International Search Report in PCT/US97/00652.

PCT International Search Report in PCT/US97/11455.

PCT International Search Report in PCT/US99/07262.

PCT International Search Report in PCT/US00/06522.

Supplementary European Search Report in EP00919398.

PCT International Search Report in PCT/US00/18411.

PCT International Search Report in PCT/US00/33126.

PCT International Search Report in PCT/US00/21189.

Delaigle, J.-F., et al. "Digital Watermarking," Proceedings of the SPIE, vol. 2659, Feb. 1, 1996, pp. 99-110.

Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.

Cox, I. J., et al. "Secure Spread Spectrum Watermarking for Multimedia," IEEE Transactions on Image Processing, vol. 6 No. 12, Dec. 1, 1997, pp. 1673-1686.

Wong, Ping Wah. "A Public Key Watermark for Image Verification and Authentication," IEEE International Conference on Image Processing, vol. 1 Oct. 4-7, 1998, pp. 455-459.

Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.

Ross Anderson, "Stretching the Limits of Steganography," LNCS, vol. 1174, May/Jun. 1996, 10 pages, ISBN: 3-540-61996-8.

Joseph J.K. O'Ruanaidh and Thierry Pun, "Rotation, Scale and Translation Invariant Digital Image Watermarking", pre-publication, Summer 1997 4 pages.

Joseph J.K. O'Ruanaidh and Thierry Pun, "Rotation, Scale and Translation Invariant Digital Image Watermarking", Submitted to Signal Processing Aug. 21, 1997, 19 pages.

OASIS (Dig Out Your Soul), Big Brother Recordings Ltd, Promotional CD image, 2008, 1 page.

Rivest, R. "Chaffing and Winnowing: Confidentiality without Encryption", MIT Lab for Computer Science, http://people.csail.mit.edu/rivest/Chaffing.txt Apr. 24, 1998, 9 pp.

PortalPlayer, PP502 digital media management system-on-chip, May 1, 2003, 4 pp.

VeriDisc, "The Search for a Rational Solution to Digital Rights Management (DRM)", http://64.244.235.240/news/whitepaper,/docs/veridisc.sub.--white.sub.--paper.pdf, 2001, 15 pp.

Cayre, et al., "Kerckhoff's-Based Embedding Security Classes for WOA Data Hiding", IEEE Transactions on Information Forensics and Security, vol. 3 No. 1, Mar. 2008, 15 pp.

Wayback Machine, dated Jan. 17, 1999, http://web.archive.org/web/19990117020420/http://www.netzero.com/, accessed on Feb. 19, 2008.

Namgoong, H., "An Integrated Approach to Legacy Data for Multimedia Applications", Proceedings of the 23rd EUROMICRO Conference, vol., Issue 1-4, Sep. 1997, pp. 387-391.

Wayback Machine, dated Aug. 26, 2007, http://web.archive,org/web/20070826151732/http://www.screenplaysmag.com/t-abid/96/articleType/ArticleView/articleId/495/Default.aspx/.

"YouTube Copyright Policy: Video Identification tool—YouTube Help", accessed Jun. 4, 2009, http://www.google.com/support/youtube/bin/answer.py?hl=en&answer=83766, 3 pp.

PCT Application No. PCT/US95/08159, filed Jun. 26, 1995, entitled, "Digital Information Commodities Exchange with Virtual Menuing", published as WO/1997/001892; Publication Date: Jan. 16, 1997.

PCT Application No. PCT/US96/10257, filed Jun. 7, 1996, entitled "Steganographic Method and Device"—corresponding to—EPO Application No. 96919405.9, entitled "Steganographic Method and Device", published as WO/1996/042151; Publication Date: Dec. 27, 1996.

PCT Application No. PCT/US97/00651, filed Jan. 16, 1997, entitled, "Method for Stega-Cipher Protection of Computer Code", published as WO/1997/026732; Publication Date: Jul. 24, 1997.

PCT Application No. PCT/US97/00652, filed Jan. 17, 1997, entitled, "Method for an Encrypted Digital Watermark", published as WO/1997/026733; Publication Date: Jul. 24, 1997.

PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.

PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.

PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.

PCT Application No. PCT/US00/18411, filed Jul. 5, 2000, entitled, "Copy Protection of Digital Data Combining Steganographic and Cryptographic Techniques".

PCT Application No. PCT/US00/33126, filed Dec. 7, 2000, entitled "Systems, Methods and Devices for Trusted Transactions", published as WO/2001/043026; Publication Date: Jun. 14, 2001.

EPO Divisional Patent Application No. 07112420.0, entitled "Steganographic Method and Device" corresponding to PCT Application No. PCT/US96/10257, published as WO/1996/042151, Dec. 27, 1996.

U.S. Appl. No. 60/222,023, filed Jul. 31, 2007 entitled "Method and apparatus for recognizing sound and signals in high noise and distortion".

"Techniques for Data Hiding in Audio Files," by Morimoto, 1995.

Howe, Dennis Jul. 13, 1998 http://foldoc..org//steganography.

CSG, Computer Support Group and CSGNetwork.com 1973 http://www.csgnetwork.com/glossarys.html.

QuinStreet Inc. 2010 What is steganography?—A word definition from the Webopedia Computer Dictionary http://www.webopedia.com/terms/steganography.html.

Graham, Robert Aug. 21, 2000 "Hacking Lexicon" http://robertgraham.com/pubs/hacking-dict.html.

Farkex, Inc 2010 "Steganography definition of steganography in the Free Online Encyclopedia" http://encyclopedia2.Thefreedictionary.com/steganography.

Horowitz, et al., The Art of Eletronics. $2^{nd}$ Ed., 1989, pp. 7.

Jimmy eat world ("futures"), Interscope Records, Pre-Release CD image, 2004, 1 page.

Aerosmith ("Just Push Play"), Pre-Release CD image, 2001, 1 page.

Phil Collins(Testify) Atlantic, Pre-Release CD image, 2002, 1 page.

STEGANOGRAPHIC METHOD AND DEVICE

CROSS REFERENCE TO RELATED APPLICATIONS

This application is a continuation of U.S. application Ser. No. 11/894,443, filed Aug. 21, 2007, which is a continuation of U.S. application Ser. No. 08/999,766, filed Jul. 23, 1997, now U.S. Pat. No. 7,568,100, which is a division of U.S. application Ser. No. 08/775,216, filed Dec. 31, 1996, now U.S. Pat. No. 5,687,236, which is a continuation of U.S. application Ser. No. 08/489,172, filed Jun. 7, 1995, now U.S. Pat. No. 5,613,004. The previously identified patents and/or patent applications are hereby incorporated by reference in their entireties, as if fully stated herein.

DEFINITIONS

Several terms of art appear frequently in the following. For ease of reference they are defined here as follows:

"Content" refers to multimedia content. The term encompasses the various types of information to be processed in a multimedia entertainment system. Content specifically refers to digitized audio, video or still images in the context of this discussion. This information may be contained within files on a multimedia computer system, the files having a particular format specific to the modality of the content (sound, images, moving pictures) or the type of systems, computer or otherwise, used to process the content.

"Digitized" refers to content composed of discrete digital samples of an otherwise analog media, which approximate that media inside a computer or other digital device. For instance, the sound of music occurs naturally, and is experienced by humans as an analog (continuous) sound wave. The sound can be digitized into a stream of discrete samples, or numbers, each of which represents an approximate value of the amplitude of the real analog wave at a particular instant in lime. These samples can be stored in files in a computer and then used to recreate the original sound wave to a high degree of accuracy. In general, content entering a digital system is digitized by Analog to Digital converters (A/D) and analog media are recreated by the digital system using a Digital to Analog (D/A) converter. In the context of this discussion content is always digitized content.

"Cryptography" is a field covering numerous techniques for scrambling information conveying messages so that when the message is conveyed between the sender and receiver an unintended party who intercepts this message cannot read it, or extract useful information from it.

A "Public Key Cryptosystem" is a particular cryptographic system where all parties possess pairs of keys for encryption and decryption. Parties to this type of system freely distribute their public keys, which other may use to encrypt messages to the owner of the public key. Such messages are decrypted by the receiver with the private key. Private keys are never distributed. A message encrypted with a public key can only be decrypted with the corresponding private key, and vice versa. A message encrypted with a private key is said to have been signed by the owner of that key. Anyone in possession of the public key may decrypt the message and known that it was encrypted, and thus signed, by the owner of the public key, since only they possess the corresponding private key.

"Steganography" is a field distinguished from cryptography, but associated with it, that covers numerous methods for hiding an informational message within some other medium, perhaps another unrelated message, in such a manner that an unintended party who intercepts the medium carrying the hidden message does not know it contains this hidden message and therefore does not obtain the information in the hidden message. In other words, steganography seeks to hide messages in plain view.

BACKGROUND OF THE INVENTION

In the current environment of computer networks and the proliferation of digital or digitized multimedia content which may be distributed over such networks, a key issue is copyright protection. Copyright protection is the ability to prevent or deter the proliferation of unauthorized copies of copyrighted works. It provides a reasonable guarantee that the author of a copyrighted work will be paid for each copy of that work.

A fundamental problem in the digital world, as opposed to the world of physical media, is that a unlimited number of perfect copies may be made from any piece of digital or digitized content. A perfect copy means that if the original is comprised of a given stream of numbers, then the copy matches the original, exactly, for each number in the stream. Thus, there is no degradation of the original signal during the copy operation. In an analog copy, random noise is always introduced, degrading the copied signal.

The act of making unlicensed copies of some content, digital or analog, whether audio, video, software or other, is generally known as piracy. Piracy has been committed for the purpose of either profit from the sale of such unlicensed copies, or to procure for the "pirate" a copy of the content for personal use without having paid for it.

The problem of piracy has been made much worse for arty type of content by the digitization of content. Once content enters the digital domain, an unlimited number of copies may be made without any degradation, if a pirate finds a way to break whatever protection scheme was established to guard against such abuses, if any. In the analog world, there is generally a degradation in the content (signal) with each successive copy, imposing a sort of natural limit on volume of piracy.

To date, three general types of schemes have been implemented in an attempt to protect copyrights.

1) Encryption
2) Copy Protection
3) Content Extensions

Copy Protection and Content Extensions generally apply in the digital world only, while a scheme related to Encryption, commonly known as scrambling, may be applied to an analog signal. This is typical in analog cable systems.

Encryption scrambles the content. Before the content is made ready for delivery, whether on floppy disk, or over a network, it must be encrypted, or scrambled. Once the content has been encrypted, it cannot be used until it is decrypted, or unscrambled. Encrypted audio data might sound like incomprehensible screeching, while an encrypted picture or video might appear as random patterns on a screen. The principle of encryption is that you are free to make as many copies as you want, but you can't read anything that makes sense until you use a special key to decrypt, and you can only obtain the key by paying for the content.

Encryption has two problems, however. 1) Pirates have historically found ways to crack encryption, in effect, obtaining the key without having paid for it; and 2) Once a single legitimate copy of some content has been decrypted, a pirate is now free to make unlimited copies of the decrypted copy. In effect, in order to sell an unlimited quantity of an encrypted piece of software, the pirate could simply buy one copy, which they are entitled to decrypt.

Copy Protection includes various methods by which a software engineer can write the software in a clever manner to determine if it has been copied, and if so to deactivate itself. Also included are undocumented changes to the storage format of the content. Copy protection was generally abandoned by the software industry, since pirates were generally just as clever as the software engineers and figured out ways to modify their software and deactivate the protection. The cost of developing such protection was not justified considering the level of piracy which occurred despite the copy protection.

Content Extension refers to any system which attaches some extra information to the original content which indicates whether or not a copy may be made. A software or hardware system must be specifically built around this scheme to recognize the additional information and interpret it in an appropriate manner. An example of such a system is the Serial Copyright Management System embedded in Digital Audio Tape (DAT) hardware. Under this system, additional information is stored on the disc immediately preceding each track of audio content which indicates whether or not it can be copied. The hardware reacts this information and uses it accordingly.

A fundamental problem with Encryption and Content Extension is the "rogue engineer". An employee who helped design such a system or an individual with the knowledge and means to analyze such a system can modify it to ignore the copyright information altogether, and make unlicensed copies of the content. Cable piracy is quite common, aided by illicit decoder devices built by those who understand the technical details of the cable encryption system. Although the cable systems in question were actually based on analog RF signals, the same principle applies to digital systems.

The practical considerations of weak encryption schemes and rogue engineers have served to limit the faith which may be put in such copyright protection schemes. The invention disclosed herein serves to address these problems with conventional systems for digital distribution. It provides a way to enforce copyright online. The invention draws on techniques from two fields, cryptography, the art of scrambling messages so that only the intended recipient may read them, and steganography, a term applied to various techniques for obscuring messages so that only the intended parties to a message even know that a message has been sent, thus it is termed herein as a stega-cipher. The stega-cipher is so named because it uses the steganographic technique of hiding a message in multimedia content, in combination with multiple keys, a concept originating in cryptography. However, instead of using the keys to encrypt the content, the stega-cipher uses these keys to locate the hidden message within the content. The message itself is encrypted which serves to further protect the message, verify the validity of the message, and redistribute the information in a random manner so that anyone attempting to locate the message without the keys cannot rely on pre-supposed, knowledge of the message contents as a help in locating it.

SUMMARY OF THE INVENTION

The invention disclosed herein combines two techniques, steganography—obscuring information that is otherwise in plain sight, and cryptography—scrambling information that must be sent over unsecured means, in a manner such that only the intended recipient may successfully unscramble it. The net effect of this system is to specifically watermark a piece of content so that if it is copied, it is possible to determine who owned the original from which the copies were made, and hence determine responsibility for the copies. It is also a feature of the system to uniquely identify the content to which it is applied.

For a comprehensive discussion of cryptography, its theory, applications and specific algorithms, see APPLIED CRYPTOGRAPHY, by Bruce Schneier, which is herein incorporated by reference at pages 66-68, 387-392.

Steganography is discussed briefly in THE CODE BREAKERS by David Kahn, which is herein incorporated by reference at pages xiii, 81-83, 522-526, and 873. An example application, Stego by Romana Machado, is also available for the Apple Macintosh. Stego can be found at the interne uniform resource locator "ftp://sumex-aim.stanford.edu/infomac/cmp/stego10a2.hqx." This application demonstrates in a simple steganographic technique to encode a text message into a graphical image without significantly distorting the image.

The invention improves upon the prior art by providing a manner for protecting copyright in the digital domain, which neither steganography or cryptography does. It improves specifically on steganography by making use of special keys which dictate exactly where within a larger chunk of content a message is to be hidden, and makes the task of extracting such a message without the proper key the equivalent of looking for a needle in a haystack.

The information encoded by the Stega-Cipher process serves as a watermark which identifies individual copies of content legally licensed to specific parties. It is integral with the content. It cannot be removed by omission in a transmission. It does not add any overhead to signal transmission or storage. It does allow the content to be stored to and used with traditional offline analog and digital media, without modification or significant signal degradation. That is, it forces would-be pirates to damage the content in order to guarantee the disabling of the watermark. These aspects of the stega-cipher all represent improvements to the art.

The invention described herein is used for protecting and enforcing copyrights in the digital or on-line domain, where there are no physical limitations on copying copyrighted content.

The invention uniquely identifies every copy of multimedia content made using the invention, composed of digitized samples whether compressed or uncompressed, including but hot limited to still digital images, digital audio, and digital video.

The invention is for use in meterware or pay-by-use systems where an online user incurs a charge each time they access a particular piece of content, or uses a software title.

The invention is for use as a general improvement to cryptographic techniques to increase the complexity of crytanalysis on a given cipher.

It is considered that the method and steps of the present invention will be modified to account for the effects of lossy compression schemes on the samples and particularly includes modification to handle MPEG compressed audio and video.

It is considered that statistical data spreading and recovery techniques, error coding or spread spectrum processing techniques might be applied in the invention to handle the effects of lossy compression, or counter the effects of a randomization attack.

It is considered that the apparatus described might be further specialized and optimized in hardware by replacing general purpose data buses and CPU or DSP driven operations with hardwired circuitry, incorporated in one or more special purpose ICs.

It is considered that the apparatus will be modeled and implemented software on general purpose computer platforms.

It is considered that stega-cipher hardware could be embedded in a consumer electronics device and used to not only identify content and copyright, but to enable use of that content.

DETAILED DESCRIPTION

I. Digital Copyright Stega-Cipher Protocol and the Decode/Encode Program

The purpose of the program described here is to watermark digital multimedia content for distribution to consumers through online services in such a way as to meet the following criteria Given a unique piece of multimedia content, composed of digitized samples, it is desirable to:

1) Uniquely identify this particular piece of content from others in a manner which is secure and undeniable (e.g. to known whether a digital audio recording is "My Way" by Frank Sinatra, or "Stairway to Heaven", by Led Zeppelin), and in a manner such as this identification can be performed automatically by an electronic device or mechanism.

2) Uniquely identify the copyright owner of the content, and the terms under which it may be distributed in general, in a manner which is secure and undeniable.

3) At such lime as is necessary, additionally, uniquely identify in a secure and undeniable manner the licensed publisher who received a particular copy of the content, and the terms under which they may redistribute or resell it.

4) At such time as is necessary, additionally, uniquely identify in a secure and undeniable manner, the licensed subscriber who received a particular copy of the content from the publisher described in item 3.

The program described in more detail below combines the techniques cryptography and steganography to hide a securely encrypted digital copyright certificate which contains information satisfying the criteria listed above, in such a manner as to be integral with the content, like a watermark on paper, so that possession of the content dictates possession of the watermark information. In addition, the watermark cannot be "found" or successfully decoded, without possession of the correct "masks" or keys, available only to those legitimately authorized, namely, those parties to a commercial transaction involving the sale of a copy of the content. Finally, the ability to distribute such watermarked content in a system which implements the watermark scheme is denied without a successfully decoded watermark. Because well known and tested cryptographic techniques are used to protect the certificate itself, these certificates are virtually impossible to forge. Finally, the watermark cannot be erased without significantly damaging the content.

The basic program represents a key part of the invention itself. This program is then used as the method by which copyright information is to be associated in an integral mariner with the content. This is a concept absent limn copy protection, encryption and content extension schemes. The copyright information itself can be made undeniable and unforgeable using cryptographic techniques, so that through it an audit trail of ownership may be established for each copy of a given piece of content, thus customizing each copy to a particular owner, in a way that can be used to identify the owner.

The value of the stega-cipher is that it provides a way to watermark the content in a way that changes it slightly, but does not impact human perception significantly. And, furthermore, that it is made difficult to defeat since one must know exactly where the information resides to extract it for analysis and use in forgery attempts, or to remove it without overly degrading the signal. And, to try to force copyright information one must first be able to analyze the encrypted copyright information, and in order to do that, one must be able to find it, which requires masks.

II. Example Embodiment of General Processing

Digital audio data is represented by a series of samples in 1 dimension, $$\{(S_1, S_2, S_3 \ldots S_n\}$$

This series is also referred to as a sample stream. The sample stream approximates an analog waveform of sound amplitude over time. Each sample represents an estimate of the wave amplitude at the instant of time the sample is recorded. For monaural audio, there is one such sample stream. Stereo audio is comprised of two sample streams, one representing the right channel, and the other representing the left. Each stream is used to drive a corresponding speaker to reproduce the stereo sound.

What is referred to as CD quality audio is characterized by 16 bit (2 byte) stereo samples, recorded at 44.1 Khz, or 44,100 samples per second in each channel. The dynamic range of sound reproduction is directly proportional to the number of bits per sample. Some lower quality recordings are done at 8 bits. A CD audio recording can be stored using any scheme for containing the 2 sample streams in their entirety. When these streams are played back at the same frequency they were recorded at, the sound recorded is reproduced to a high degree of accuracy.

The sample is processed in order from first sample to last. For the purpose of the invention disclosed, the stream is separated into sample windows, each of which has a fixed number of consecutive samples from the stream, and where windows do not overlap in the sample stream. Windows may be contiguous in the sample stream. In this discussion assume each window contains 128 samples, and that windows are contiguous. So, the windows within the stream look like $$\{[S_1, S_2, S_3 \ldots S_{128}], [S_{129}, S_{130}, S_{131} \ldots S_{256}], \ldots [S_{n-128} \ldots S_n]\}$$

where [ . . . ] denotes each window and any odd samples at the end of the stream which do not completely fill a window can be ignored, and simply passed through the system unmodified.

These windows will be used as input for the discrete Fast Fourier Transform (and its inverse) operation.

Briefly, Fourier Transform methods are based on the principle that a complex waveform, expressed as amplitude over time and represented by a sample stream, is really the sum of a number of simple waveforms, each of which oscillate at different frequencies.

By complex, it is meant that the value of the next sample is not easily predicted from the values of the last N samples or the time of the sample. By simple it is meant that the value of the sample is easily predictable from the values of the last N samples and/or the time of the sample.

The sum of multiple simple waves is equivalent to the complex wave. The discrete FFT and its inverse simply translate a limited amount of data from one side of this equivalence to the other, between the complex waveform and the sum of simple waves. The discrete FFT can be used to translate a series of samples representing amplitude over time (the complex wave, representing a digital audio recording) into the same number of samples representing total spectral energy in a givers range of frequencies (the simple wave components)

at a particular instant of time. This instant is the time in the middle of the original amplitude/time samples. The inverse discrete FFT translates the data in the other direction, producing the complex waveform, from its simpler parts.

Each 128 sample window will be used as an input to the discrete FFT, resulting in 128 bins representing each of 128 frequency hands, ranging from 0 Hz to 22 Khz (the Nyquist frequency, or 1/2 the sampling rate).

Information can be encoded into the audio signal in the frequency domain or in the time domain. In the latter case, no FFT or inverse FFT is necessary. However, encoding in the frequency domain is recommended, since its effects are scattered over the resultant time domain samples, and not easily predicated. In addition, frequency domain encoding makes it more likely that randomization will result in noticeable artifacts in the resultant signal, and therefore makes the stega-cipher more defensible against such attacks. It is in the frequency domain that additional information will he encoded into the audio signal for the purpose of this discussion. Each frequency hand in a given time slice can potentially be used to store a small portion of some additional information to be added to the signal. Since these are discrete estimates, there is some room for error which will not significantly effect the perceived quality of the signal, reproduced after modification, by the inverse FFT operation. In effect, intentional changes, which cannot be distinguished from random variations are introduced in the frequency domain, for the purpose of storing additional information in the sample stream.

These changes are minimized so as not to adversely affect the perceived quality of the reproduced audio signal, after it has been encoded with additional information in the manner described below. In addition, the location of each of these changes is made virtually impossible to predict, an innovation which distinguishes this scheme from simple steganographic techniques.

Note that this process differs from the Nagata, et al. U.S. Pat. Nos. 1,979,210 and 5,073,925, which encode information by modulating an audio signal in amplitude/time domain. It also differs in that the modulations introduced in the Nagata process (which are at very low amplitude and frequency relative to the carrier wave as to remain inaudible) carry only copy/don't copy information, which is easily found and circumvented by one skilled in the art. Also, there is no limitation in the stega-cipher process at to what type of information can be encoded into the signal, and there is more information storage capacity, since the encoding process is not bound by any particular frequency of modulation but rather by the number of samples available. The granularity of encoding in the stega-cipher is determined by the sample window size, with potentially 1 bit of space per sample or 128 bits per window (a secure implementation will halve this to 64 bits). In Nagata. et al. the granularity of encoding is fixed by the amplitude and frequency modulation limits required to maintain inaudibility. These limits are relatively low, and therefore make it impractical to encode more than simple copy/don't copy information using the Nagata process.

III. Example Embodiment of Encoding and Decoding

A modification to standard steganographic technique is applied in the frequency domain described above, in order to encode additional information into the audio signal.

In a scheme adapted from cryptographic techniques, 2 keys are used in the actual encode and decode process. For the purposes of this invention the keys are referred to as masks. One mask, the primary, is applied to the frequency axis of FFT results, the other mask is applied to the time axis (this will he called the convolution mask). The number of bits comprising the primary mask are equal to the sample window size in samples (or the number of frequency bands computed by the FFT process), 128 in this discussion. The number of bits in the convolution mask are entirely arbitrary. This implementation will assume a time mask of 1024 bits. Generally the larger the key, the more difficult it is to guess.

Prior to encoding, the primary and convolution masks described above are generated by a cryptographically secure random generation process. It is possible to use a block cipher like DES in combination with a sufficiently pseudo-random seed value to emulate a cryptographically secure random bit generator. These keys will be saved along with information matching them to the sample stream in question in a database for use in decoding, should that step become necessary.

Prior to encoding, some additional information to he encoded into the signal is prepared and made available to the encoder, in a hit addressable manner (so that it may be read one bit at a time). If the size of the sample stream is known and the efficiency characteristics of the stega-cipher implementation are taken into account, a known limit may he imposed on the amount of this additional information.

The encoder captures one sample window at a time from the sample stream, in sequential, contiguous order. The encoder tracks the sequential number of each window it acquires. The first window is 0. When the number of windows processed reaches the number of bits in the window musk, minus one, the next value of the window counter will be reset to 0.

This counter is the convolution index or phase. In the current implementation it is used as a simple index into the convolution bitmask. In anticipated developments it will he used to perform convolution operations on the convolution mask to determine which hit to use. For instance the mask might by rotated by a number corresponding to the phase, in bits to the left and XORed with the primary mask to produce a new mask, which is then indexed by the phase. There are many possibilities for convolution.

The encoder computes the discrete MT of the sample window.

Starting with the lowest frequency band, the encoder proceeds through each band to the highest, visiting each of the 128 frequency bands in order. At each band value, the encoder takes the hit of the primary mask corresponding to the frequency hand in question, the bit of the convolution mask corresponding to the window in question, and passes these values into a boolean function. This function is designed so that it has a near perfectly random output distribution. It will return true for approximately 50% of its input permutations, and false for the other 50%. The value returned for a given set of inputs is fixed, however, so that it will always return the same value given the same set of inputs.

If the function returns true, the current frequency band in the current window is used in the encoding process, and represents a valid piece of the additional information encoded in the signal. If the function returns false, this cell, as the frequency band in a given window is called, is ignored in the process. In this manner it is made extremely difficult to extract the encoded information from the signal without the use of the exact masks used in the encoding process. This is one place in which the stega-cipher process departs from traditional steganographic implementations, which offer a trivial decode opportunity if one knows the information is present. While this increases the information storage capacity of the carrier signal, it makes decoding trivial, and further degrades die signal. Note that it is possible and desirable to modify the boolean cell flag function so that it returns true <50% of the time. In general, the fewer cells actually used in the encode, the more difficult they will be to find and the less degradation of content will be caused, provided the function is designed correctly. There is an obvious tradeoff in storage capacity for this increased security and quality.

The encoder proceeds in this manner until a complete copy of the additional information has been encoded in the carrier signal. It will be desirable to have the encoder encode multiple copies of the additional information continuously over the duration of the carrier signal, so that a complete instance of this information may be recovered from a smaller segment of a larger signal which has been split into discontinuous pieces or otherwise edited. It is therefore desirable to minimize the size of the information to he encoded using both compact design and pre-encoding compression, thus maximizing redundant encoding, and recoverability from smaller segments. In a practical implementation of this system it is likely the information will be first compressed by a known method, and then encrypted using public-key techniques, before being encoded into the carrier signal.

The encoder will also prepare the package of additional information so that it contains an easily recognizable start of message delimiter, which can be unique to each encoding and stored along with the keys, to serve as a synchronization signal to a decoder. The detection of this delimiter in a decoding window signifies that the decoder can be reasonably sure it is aligned to the sample stream correctly and can proceed in a methodic window by window manner. These delimeters will require a number of bits which minimizes the probability that this bit sequence is not reproduced in a random occurrence, causing an accidental misalignment of the decoder. A minimum of 256 bits is recommended. In the current implementation 1024 bits representing a start of message delimeter are used. If each sample is random, then each hit has a 50% probably of matching the delimeter and the conditional probability of a random match would be $1/2^{1024}$. In practice, the samples are probably somewhat less than random, increasing the probability of a match somewhat.

The decode process uses the same masks in the same manner, only in this case the information is extracted one hit at a time from the carrier signal.

The decoder is assumed to have access to the proper masks used to encode the information originally. These masks might be present in a database, which can be indexed by a value, or values computed from the original content, in a manner insensitive to the modifications to the content caused by the stega-cipher process. So, given an arbitrary piece of content, a decoder might first process the content to generate certain key values, and then retrieve the decode masks associated with the matching key values from the database. In the case where multiple matches occur, or none are found, it is conceivable that all mask sets in the database could be tried sequentially until a valid decode is achieved, or not, indicating no information is present.

In the application of this process, it is anticipated that encoding operations may be done on a given piece of content lip to 3 times, each adding new information and using new masks, over a sub-segment of the content, and that decode operations will be done infrequently. It is anticipated that should it become necessary to do a search of a large number of masks to find a valid decode, that this process can be optimized using a guessing technique based on close key matching, and that it is not a time critical application, so it will be feasible to test large numbers of potential masks for validity on a given piece of content, even if such a process takes days or weeks on powerful computers to do a comprehensive search of known mask sets.

The decode process is slightly different in the following respect. Whereas the encoding process can start at any arbitrary point in the sample stream, the decode process does riot known where the encode process began (the exact offset in samples to the start of the first window). Even though the encode process, by convention, starts with sample 0, there is no guarantee that the sample stream has not been edited since encoding, leaving a partial window at the start of the sample stream, and thus requiring the decoder to find the first complete window to start the decode. Therefore, the decode process will stint at the first sample, and shift the sample window along by 1 sample, keeping the window index at 0, until it can find a valid decode delimeter encoded in the window. At this point, the decoder knows it has synchronized to the encoder, and can then proceed to process contiguous windows in a more expedient manner.

Example Calculations Based on the Described Implementations for Adding Copyright Certificate Information to CD Quality Digital Audio:

In a stream of samples, every 128 samples will contain, on average 64 bits of certificate related information. Digital audio is composed of 16 bit samples, at 44.1 Khz, or 44,100 samples per second. Stereo audio provides 2 streams of information at this rate, left and right, or 88,200 samples per second. That yields approximately 689 contiguous sample windows (of 128 samples) per second in which to encode information. Assume a song is 4 minutes long, or 240 seconds. This yields 240*689=165,360 windows, which on average (0.50% utilization) contain 64 bits (8 bytes) each of certificate information. This in turn gives approximately 1291 Kb of information storage space per 4 minute stereo song (1.2 MB). There is ample room for redundant encoding of information continuously over the length of the content. Encoding 8 bytes for every 256 bytes represents 3.1% of the signal information. Assuming that a copyright certificate requires at most approximately 2048 bytes (2K), we can encode the same certificate in 645 distinct locations within the recording, or approximately every $37/100$ths of a second.

Now to account for delimeters and synchronization information. Assuming a sync marker of 1024 bits to avoid random matches, then we could prefix each 2K certificate block with this 1021 hit marker. It takes 256 windows to store 2K, and under this proposed scheme, the first 16 windows are reserved for the sync marker. A decoder could search for this marker by progressively matching each of the first 16 windows (64 bits at a time) against the corresponding portion of the sync marker. The decoder could reset the match advancing through the sample stream, as soon as one window did not conform to the sync marker and proceed in this manner until it matches 16 consecutive windows to the marker, at which point it is synchronized.

Under this scheme, 240 windows, or 1.92K remain for storing certificate information, which is not unreasonable.

IV. Possible Problems, Attacks and Subsequent Defenses

A. Randomization

The attacker simply randomizes the least significant hits of each data point in the transform buffer, obliterating the synchronization signal and the watermark. While this attack can remove the watermark, in the context in which stega-cipher is to be used, the problem of piracy is kept to a minimum at least equal to that afforded by traditional media, since the system will not allow an unwatermarked piece of content to be traded for profit and watermarks cannot be forged without the proper keys, which are computationally difficult to obtain by brute-force or crytanalysis. In addition, if the encoding is managed in such a way as to maximize the level of changes to the sample stream to be just at the threshold below human perception, and the scheme is implemented to anticipate randomization attempts, it is possible to force the randomization level to exceed the level that can be perceived and create destructive artifacts in the signal, in much the same manner as a VHS cassette can be manufactured at a minimal signal level, so that a single copy results in unwatchable static.

B. Low Bit-Depth Bitmaps (Black & White Images)

These bitmaps would he too sensitive to the steganization process, resulting in unacceptable signal degradation, and so are not good candidates for the stega-cipher process. The problem may be circumvented by inflating bit-depth, although this is an inefficient use of space and bandwidth.

C. Non-Integer Transforms

The FFT is used to generate spectral energy information for a given audio signal. This information is not usually in integer format. Computers use methods of approximation in these cases to represent the real numbers (whole numbers plus fractional amounts). Depending on the exact value of the number to he represented slight errors, produced by rounding off the nearest real number that can be completely specified by the computer occur. This will produce some randomization in the least significant hit or hits. In other words, the same operation on the same sample window might yield slightly different transform values each time. It is possible to circumvent this problem using a modification to the simple LSB steganographic technique described later. Instead of looking at the LSB, the stega-cipher can use an energy quantization technique in place of the LSB method. Some variant of rounding the spectral energy values up or down, with a granularity greater than the rounding error should work, without significantly degrading the output samples.

V. A Method and Protocol for Using the Stega-Cipher

The apparatus described in the claims below operates on a window by window basis over the sample stream. It has no knowledge of the nature of the specific message to be encoded. It merely indexes into a bit stream, and encodes as many of those bits as possible into a given sample window, using a map determined by the given masks.

The value of encoding information into a single window in the sample stream using such an apparatus may not be inherently apparent until one examines the manner in which such information will be used. The protocol discussed in this section details how messages which exceed the encoding capacity of a single sample window (128 samples) may be assembled from smaller pieces encoded in the individual windows and used to defend copyrights in an online situation.

An average of 64 bits can be encoded into each window, which equals only 8 bytes. Messages larger than 8 bytes can be encoded by simply dividing the messages up and encoding small portions into a string of consecutive windows in the sample stream. Since the keys determine exactly how rimy bits will be encoded per window, and an element of randomness is desirable, as opposed to perfect predictability, one cannot be certain exactly how many bits are encoded into each window.

The start of each message is marked by a special start of message delimeter, which, as discussed above is 1024 hits, or 128 bytes. Therefore, if precisely 8 bytes are encoded per window, the first 16 windows of any useable message in die system described here are reserved for the start of message delimeter. For the encoder, this scheme presents little challenge. It simply designates the first sample window in the stream to he window 0, and proceeds to encode the message delimeter, bit-by-hit into each consecutive window. As soon as it has processed the last bit of the SOM delimeter it continues by encoding 32 bits representing the size, in bytes of the complete message to follow. Once the 32nd and final bit of the size is encoded, the message itself is encoded into each consecutive window, one bit at a time. Some windows may contain more encoded bits than others, as dictated by the masks. As the encoder processes each window in the content it increments its window counter. It uses this counter to index into the window mask. If the number of windows required to encode a complete message is greater than the size of this mask, 256 bits in this case, or 256 windows, then it simply resets the counter after window 255, and so on, until a complete message is encoded. It can then start over, or start on a new message.

The decoder has a bigger challenge to face. The decoder is given a set of masks, just like encoder. Unlike the encoder, the decoder cannot be sure that the first series of 128 samples it receives are the window 0 start of message, encoded by the decoder. The sample stream originally produced by an encoder may have been edited by dipping its ends randomly or splicing pieces together. In that case, the particular copy of the message that was clipped is unrecoverable. The decoder has the start of message delimeter used to encode the message that the decoder is looking for. In the initial state, the decoder assumes the first window it gels is window 0. It then decodes the proper number of bits dictated by the masks it was given. It compares these bits to the corresponding bits of the start of message delimeter. If they match, the decoder assumes it is still aligned, increments the window counter and continues. If the bits do not match, the decoder knows it is not aligned. In this case, it shills once more sample onto the end of the sample buffer, discarding the first sample, and starts over. The window counter is set to 0. The decoder searches one sample at a time for an alignment lock. The decoder proceeds in this manner until it has decoded a complete match to the start of message delimeter or it exhausts the sample stream without decoding a message. If the decoder can match completely the start of message delimeter bit sequence, it switches into aligned mode. The decoder will now advance through the sample stream a full window at a time (128 samples). It proceeds until it has the 32 bits specifying the message size. This generally won't occupy more than 1 complete window. When the decoder has locked onto the start of message delimeter and decoded the message size, it can now proceed to decode as many consecutive additional windows as necessary until it has decoded a complete message. Once it has decoded a complete message, the state of the decoder can be reset to un-synchronized and the entire process can be repeated starting with the next 128 sample window. In this mariner it is not absolutely necessary that encoding windows be contiguous in the sample stream. The decoder is capable of handling random intervals between the end of one message and the start of another.

It is important to note that the circuit for encoding and decoding a sample window does not need to be aware of the nature of the message, or of any structure beyond the start of message delimeter and message size. It only needs to consider a single sample window, its own state (whether the decoder is misaligned, synchronizing, or synchronized) and what bits to encode/decode.

Given that the stega-cipher apparatus allows for the encoding and decoding of arbitrary messages in this manner, how can it he used to protect copyrights?

The most important aspect of the stega-cipher in this respect is that fact that it makes the message integral with the content, and difficult to remove. So it cannot be eliminated simply by removing certain information prepended or appended to the sample stream itself. In fact, removing an arbitrary chunk of samples will not generally defeat the stega-cipher either.

Given that some information can thus be integrated with the content itself, the question is then how best to take advantage of this arrangement in order to protect copyrights.

The following protocol details how the stega-cipher will he exploited to protect copyrights in the digital domain.

In a transaction involving the transfer of digitized content, there are at least 3 functions involved:

The Authority is a trusted arbitrator between the two other functions listed below, representing parties who actually engage in the transfer of the content. The Authority maintains a database containing information on the particular piece of content itself and who the two parties engaged in transferring the content are. The Authority can perform stega-cipher encoding and decoding on content.

The Publisher, or online distributor is the entity which is sending the copyrighted content to another party. The Publisher can perform stega-cipher encoding and decoding on content.

The Consumer is the person or entity receiving the copyrighted content, generally in exchange for some consideration such as money. The consumer cannot generally perform stega-cipher encoding or decoding on content.

Each of these parties can participate in a message exchange protocol using well known public-key cryptographic techniques. For instance, a system licensing RSA public key algorithms might be used for signed and encrypted message exchange. This means that each party maintains a public key/private key pair, and that the public keys of each party are freely available to any other party. Generally, the Authority communicates via electronic links directly only to the Publisher and the Consumer communicates directly only with the publisher.

Below is an example ( ) how the protocol operates from the time a piece of content enters an electronic distribution system to the time it is delivered to a Consumer.

A copyright holder (an independent artist, music publisher, movie studio, etc.) wishes to retail a particular title online. For instance, Sire Records Company might wish to distribute the latest single from Seal, one of their musical artists, online. Sire delivers a master copy of this single, "Prayer for the Dying", to the Authority, Ethical Inc. Ethical converts the title into a format suitable for electronic distribution. This may involve digitizing an analog recording. The title has now become content in the context of this online distribution system. The title is not yet available to anyone except Ethical Inc., and has not yet been encoded with the stega-cipher watermark. Ethical generates a Title Identification and Authentication (TIA) certificate. The certificate could be in any format. In this example it is a short text file, readable with a small word-processing program, which contains information identifying
  the title
  the artist
  the copyright holder
  the body to which royalties should he paid
  general terms for publishers' distribution
  any other information helpful in identifying this content Ethical then signs the TIA with its own private key, and encrypts the TIA certificate plus its signature with its own public key. Thus, the Ethical can decrypt the TIA certificate at a later time and know that it generated the message and that the contents of the message have not been changed since generation.

Sire Records, which ultimately controls distribution of the content, communicates to the Ethical a specific online Publisher that is to have the right of distribution of this content. For instance, Joe's Online Emporium. The Authority, Ethical Inc. can transmit a short agreement the Distribution Agreement to the Publisher, Joe's Online Emporium which lists
  the content title
  the publisher's identification
  the terms of distribution
  any consideration paid for the right to distribute the content
  a brief statement of agreement with all terms listed above The Publisher receives this agreement, and signs it using its private key. Thus, any party with access to the Joe's Online Emporium's public key could verify that Joe's signed the agreement, and that the agreement has not been changed since Joe's signed it. The Publisher transmits the signed Distribution Agreement to the Authority. Ethical Inc.

Ethical Inc. now combines the signed TIA certificate and the Distribution Agreement into a single message, and signs the entire message using its private key. Ethical has now created a Publisher Identification message to go in its own stega-cipher channel into the content. Ethical Inc. now generates new stega-cipher masks and encodes this message into a copy of the content using a stega-cipher encoder. The Authority saves the masks as Receipt in a database, along with information on the details of the transfer, including the title, artist and publisher.

Ethical then transfers this watermarked copy to the Joe's Online Emporium, the Publisher. Well known encryption methods could be used to protect the transfer between the Authority and the Publisher. The Authority may now destroy its copy, which the Publisher has received. The Publisher, Joe's Online Emporium now assumes responsibility for any copies made to its version of the content, which is a Publisher Master copy.

Finally, the Consumer, John Q. Public wishes to purchase a copy of the content from Joe's Online Emporium. Joe's Emporium sends the John Q. Public a short agreement via an electronic communication link, similar to Publisher's Distribution Agreement, only this is a Purchase Agreement, which lists
  the content title
  consumer identification
  the terms of distribution
  the consideration pas for the content
  a brief statement of agreement with the terms above John Q. Public signs this agreement with his private key and returns it to the Joe's Online Emporium. The Publisher, Joe's prepares to encode its own stega-cipher watermark onto a copy of the content by generating a set of masks for the algorithm Joe's (inline Emporium then stores these masks (a receipt) in its own database, indexed by title and consumer. Joe's Online Emporium signs the agreement received from John Q. Public with the Emporium's own private key, and forwards it to the Authority, Ethical Inc., along with a copy of the masks. It is important to note that this communication should he done over a secured channel. The Authority verities the Publisher and Consumer information and adds it own signature to the end of the message, approving the transaction, creating a Contract of Sale. The Authority adds the Publisher's receipt (mask set) to its database, indexed by the title, the publisher, and the consumer identification. The Authority signs the Contract of Sale by encrypting it with their private key. So anyone with the Authority's public key (any Publisher) could decrypt the Contract of Sale and verify it, once it was extracted from the content. The Publisher then transmits the signed Contract of Sale back to the Publisher, who uses a stega-cipher device to imprint this Contract as its own watermark over the content. The Publisher then transmits the newly watermarked copy to the Consumer, who is accepting responsibility for it. The Publisher destroys their version of the consumer's copy.

If this procedure is followed for all content distribution within such an online system then it should be possible for the Authority to identify the owner of a piece of content which appears to be unauthorized. The Authority could simply try its database of stega-cipher keys to decode the watermark in the content in question. For instance, if a copy of Seal's latest single originally distributed with stega-cipher watermarks showed, up on an Internet ftp site the Authority should be able to extract a TIA Certificate and Distribution Agreement or a Contract of Sale identifying the responsible party. If a Publisher sold this particular copy to a Consumer, that particular publisher should be able to extract a Contract of Sale, which places responsibility with the Consumer. This is not a time critical application, so even if takes days or weeks, it is still worthwhile.

In a modification to the protocol discussed above, each Publisher might act as its own Authority. However, in the context of online services, this could open avenues of fraud committed by the collusion of certain Publishers and Consumers. Using an Authority, or one of several available Authorities to keep records of Publisher-Consumer transactions and verify their details decreases the likelihood of such events.

It should also he obvious that a similar water, marking system could he used by an individual entity to watermark its own content for its own purposes, whether online or in physical media. For instance, a CD manufacturer could incorporate unique stega-cipher watermarks into specific batches of its compact discs to identify the source of a pirate ring, or to identify unauthorized digital copies made from its discs. This is possible because the stega-cipher encoding works with the existing formats of digital samples and does not add any new structures to the sample data that cannot he handled on electronic or mechanical systems which predate the stega-cipher.

VI. Increasing Confidence in the Stega-Cipher

The addition of a special pre-encoding process can make stega-cipher certificates even more secure and undeniable. I-lash value's may be incorporated which match exactly the content containing the watermark to the message in the watermark itself. This allows as a verification that the watermark decoded was encoded by whomever signed it into this precise location in this specific content.

Suppose one wants to use a 256 bit (32 byte) hash value which is calculated with a secure one-way hash function over each sample in each sample window that will contain the message. The hash starts with a seed value, and each sample that would be processed by the encoder when encoding the message is incorporated into the hash as it is processed. The result is a 256 bit number one can be highly confident is unique, or sufficiently rare to make intentionally duplicating it with another series of samples difficult.

It is important that the hash function be insensitive to any changes in the samples induced by the stega-cipher itself. For instance, one might ignore the least significant bit of each sample when computing the hash function, if the stega-cipher was implemented using a least significant bit encode mode.

Based on the size of the non-hash message, one knows the hash-inclusive message requires 32 more bytes of space. Once can now calculate the size of a signed encrypted copy of this message by signing and encrypting exactly as many random bytes as are in the message, and measuring the size of the output in bytes. One now knows the size of the message to he encoded. One can pre-process the sample stream as follows.

Proceed through stega-cipher encode loop as described in the claims. Instead of encoding, however, calculate hash values for each window series which will contain the message, as each sample is processed. At the end of each instance of "encoding" take the resultant hash value and use it to create a unique copy of the message which includes the hash value particular to the series of sample windows that will be used to encode the message. Sign and encrypt this copy of the message, and save it for encoding in the same place in the sample stream.

A memory efficient version of this scheme could keep on hand the un-hashed message, and as it creates each new copy, back up in the sample stream to the first window in the series and actually encode each message, disposing of its afterwards.

The important result is evident on decoding. The decoding party can calculate the same hash used to encode the message for themselves, but on the encoded samples. If the value calculated by the decoding party does not match the value contained in the signed message, the decoder is alerted to the fact that this watermark was transplanted from somewhere else. This is possible only with a hash function which ignores the changes made by the stega-cipher after the hash in the watermark was generated.

This scheme makes it impossible to transplant watermarks, even with the keys to the stega-cipher.

APPENDIX

Psuedo-code

```
const int WINDOW_RESET = 256;
const int WINDOW_SIZE = 128;
const int MARKER_BITS = 1024;
const int CHUNK_BITS = 2048 *8;
int window_offset;
int msg_bit_offset;
int frequency_offset;
Boolean useCell;
/* 8 bits per bye, 1 byte per char */
unsigned char frequency_mask[WINDOW_SIZE/8];
unsigned char window_mask[WINDOW_RESET/8];
unsigned char msg_start_marker[MARKER_BITS/8];
unsigned char msg_end_marker[MARKER_BITS/8];
Int16 amplitude_sample_buffer[WINDOW_SIZE];
float power_frequency_buffer[WINDOW_SIZE];
unsigned char message_buffer[CHUNK_BITS/8];
void doFFT(Int16 *amp_sample_buffer, float *power_freq_buffer,int size);

void doInverseFFT(Int16 *amp_sample_buffer, float *power_freq_buffer,
int size);
void initialize( );
Bit getBit(unsigned char *buffer,int bitOffset);
Boolean map(Bit window_bit, Bit band_bit, int window, int frequency);

Boolean getSamples(Int16 *amplitude_sample_buffer,int samples);

void encode( )
void initialize( )
{
   /* message to be encoded is generated */
   /* message is prefixed with 1024 bit msg_start_marker */
   /* message is suffixed with 1024 bit msg_end_marker */
   /* remaining space at end of message buffer padded with random bits */
   window_offset = 0;
   msg_bit_offset = 0;
   frequency_offset = 0;
   frequency_mask loaded
   window_mask loaded
   zeroAmpSampleBuffer( );
}
Boolean getSamples(Int16 *buffer,int samples)
{
   /* get samples number of samples and shift them contiguously into the
   sample
```

APPENDIX-continued

Psuedo-code

```
    buffer from right to left*/
    if(samples < samples available)
        return false;
    else
        return true;
}
void doFFT(int16 *sample_buffer, float *spectrum_buffer, int size)
{
    calculate FFT on sample_buffer, for size samples
    store result in spectrum buffer
}
void doInverseFFT(Int16 *sample_buffer,float *spectrum_buffer,int size)
{
    calculate inverse FFT on spectrum_buffer
    store result in sampe_buffer
}
Bit getBit(unsigned char *buffer,in bitOffset)
{
    returns value of specified bit in specified buffer
    either 0 or 1, could use Boolean (true/false) values for bit set of bit
        off
}
Boolean map(Bit window_bit,Bit band_bit,int window, int frequency_
    )
{
    /* this is the function that makes the information difficult to find */
    /* the inputs window_bit and band_bit depend only on the
        mask values
        used for encoding the information, they are 1) random, 2) secret */
    /* window and frequency values are used add time and frequency band
        dependent
        complexity to this function */
    /* this function is equivalent to a Boolean truth TABLE with window *
        frequency * 4
        possible input combinations and 2 possible output */
    /* for any input combination, the output is either true or false */
    /* window ranges from 0 to WINDOW_RESET −1 */
    /* frequency ranges from 0 to WINDOW_SIZE −1 */
    return calculated truth value
}
void encodeBit(float *spectrum_buffer,int freq_offset,Bit
theBit)
{
    /* modifies the value of the cell in spectrum_buffer, indexed by
        freq_offset
        in a manner that distinguishes each of the 2 possible values of
        theBit,
        1 or 0
    */
    /* suggested method of setting the Least Significant bit of the cell ==
    theBit */
    /* alternative method of rounding the value of the cell upward or
    downward to
        certain fractional values proposed
            i.e. <= .5 fractional remainder signifies 0, > .5 fraction remainder
                signifies 1
    */
}
void encode( )
{
    initialize( );
    do {
    if(getSamples(amplitude_sample_buffer) == false)
        return
    doFFT(amplitude_sample_buffer,power_frequency_buffer,
    WINDOW_SIZE);
    for (frequency_offset = 0; frequency_offset < WINDOW_SIZE;
    frequency_offset++){
        useCell = map(getBit(window_mask,window_offset),
            getBit(frequency_mask,frequency_offset),
            window_offset, frequency_offset);
        if(useCell == true){
            encodeBit(power_frequency_buffer,frequency_offset,
                getBit(message_buffer,msg_bit_offset));
            message_bit_offset ++;
            if(msg_bit_offset == MESSAGEBITS){
                initialize( );
                break; /* exit frequency loop */
            }
        }
    }
    doInverseFFT(amplitude_sample_buffer,power_frequency_buffer,
        WINDOW_SIZE);
    outputSamples(amplitude_sample_buffer);
    window_offset++;
    if(window_offset == WINDOW_RESET){
        window_offset = 0;
    }
    } while(true);
}
```

The encode( )procedure processes an input sample stream using the specified frequency and window masks as well as a pre-formatted message to encode.

encode( )processes the sample stream in windows of WINDOW_ SIZE samples, contiguously distributed in the sample stream, so it advances WINDOW_ SIZE samples at a time.

For each sample window, encode( )first compute the FFT of the window, yielding its Power Spectrum Estimation. For each of these windows PSEs, encode( )then uses the map( ) function to determine where in each PSE to encode the bits of the message, which it reads from the message buffer, on ebit at a time. Each time map( )returns true, encode( )consumes another sample from the message.

After each window is encoded, encode( )computes the inverse FFT on the PSE to generate a modified sample window, which is then output as the modified signal. It is important the sample windows NOT overlap in the sample stream, since this would potentially damage the preceeding encoding windows in the stream.

Once the message is entirely encoded, including its special end of message marker bit stream, encode( )resets it internal variables to being encoding the message once more in the next window, encode( )proceeds in this manner until the input sample stream is exhausted.

```
enum {
    Synchronizing,
    Locked
}; /* decode states */
unsigned char message_end_buffer[MARKER_BITS];
Bit decodeBit(float *spectrum_buffer,int freq_offset)
{
    /* reads the value of the cell in spectrum_buffer, indexed by freq_offset
        in a manner that distinguishes each of the 2 possible values of an
        encoded bit, 1 or 0
    */
    /* suggested method of testing the Least Significant bit of the cell */
    /* alternative method of checking the value of the cell versus certain
    fractional
        remainders proposed.
            i.e. <= .5 fractional remainder signifies 0, > .5 fraction remainder
                signifies 1
    */
    return either 1 or 0 as appropriate
}
Boolean decode( )
{
    /* Initialization */
    state = Synchronizing
    window_offset = 0;
    set frequency mask
    set window mask
    clear sample buffer
    int nextSamples = 1;
    int msg_start_offset = 0;
```

```
clear message_end_buffer
Bit aBit;
Boolean bitsEqual;
do {
if(state == Synchronizing){
   nextSamples = 1;
   window_offset = 0;
}
else
   nextSamples = WINDOW_SIZE;
if(getSamples(amplitude_sample_buffer) == false)
   return false;
doFFT(amplitude_sample_buffer,power_frequency_buffer,
   WINDOW_SIZE);/* 2 */
for (frequency_offset = 0; frequency_offset < WINDOW_SIZE;
frequency_offset++){
   useCell = map(getBit(window_mask,window_offset),
      getBit(frequency_mask,frequency_offset),
      window_offset, frequency_offset);
   if(useCell == true){
      aBit = decodeBit(power_frequency_buffer,
         frequency_offset);
      setBit(message_buffer,message_bit_offset,aBit);
      message_bit_offset ++;
   }
   else
      continue;
   if(state == Synchronizing){
      bitsEqual =
      compareBits(message_start_marker,message_buffer,
         message_bit_offset);
      if(!bitsEqual){
         message_bit_offset = 0;
         misaligned = true;
         break; /* exit frequency loop */
      }
      else if(message_bit_offset == MARKER_BITS)
         state == Locked;
   }
   else {
      /* locked onto encoded stream */
      shift aBit into right side of message_end_buffer
      bitsEqual = compareBits(message_end_buffer,
         msg_end_marker,MARKER_BITS);
      if(bitsEqual)
         return true;
   }
 }
} while (true);
}
```

The decode( )procedure scans an input sample stream using specified window and frequency masks, until it either decodes a valid message block, storing it in a message buffer, or exhausts the sample stream.

The decode( )procedure starts in state Synchronizing, in which it does not know where in the sample stream the encoding windows are aligned. The procedure advances the sample window through the sample stream one sample at a time, performing the FFT calculation on each window, and attempting to decode valid message bits from the window. As it extracts each bit using the map( )function, the decode( )procedure compares these bits against the start of message marker. As soon as a mismatch is detected, the decode( )procedure knows it is not yet properly aligned to an encoding window, and immediately ceases decoding bits from the current window and moves to the next window, offset by 1 sample. The decode( )procedure continues in this manner until it matches successfully the complete bitstream of a start of message marker. At this point the decode( )procedure assumes it is aligned to an encoded message and can then decode bits to the message buffer quickly, advancing the sample window fully at each iterations. It is now in Locked mode. For each bit it stores in the message buffer when in Locked mode, the decode( )procedure also shifts the same bit value into the least significant bit of the message$_{13}$ end_buffer. After each bit is decoded in Locked mode, the decode( )procedure checks compares the message_ end_ buffer with the msg_ end_ marker in a bit by bit manner. When a complete match is found, decode( )is finished and returns true. If the sample stream is exhausted before this occurs, decode( )returns false. If decode( )returns true, a valid message is stored in the message buffer, including the start and end of message markers.

REFERENCES

The following references may be of use to those lacking skill in the art of steganography or the various cryptographic techniques discussed in this document Press, Flannery, Teukolsky, and Vetterling, Numerical Recipes in C, Cambridge University Press, 1988

I2. Fourier Transform Spectral Methods, pgs. 398-470

Ken C. Pohlman, Principles of Digital Audio, 2nd ed., SAMS, 1991

B. Schneier, Applied Cryptography, John Wiley & Sons, Inc. New York 1994 particularly the following sections for steganography:

4.1 Subliminal Channel, pgs. 66-68

16.6 Subliminal Channel, pgs. 387-392 particularly the following sections for cryptography and digital signatures

Chapter 2: Protocol Building Blocks, pgs 28-41

D. Kahn, The Code Breakers, The Macmillan Company, 1969 particularly the following sections on steganography
pgs xiii, 513, 515
U.S. Patents.
U.S. Pat. No. 4,908,873 Philibert et al.
U.S. Pat. No. 5,412,718 Narasimhalu, et al.
U.S. Pat. No. 4,979,210 Nagata et al.
U.S. Pat. No. 5,073,925 Nagata et al.
U.S. Pat. No. 5,287,407 Holmes
U.S. Pat. No. 4,980,782 Ginkel
U.S. Pat. No. 5,408,505 Indeck, et al.
U.S. Pat. No. 5,365,586 Indeck, et al.
U.S. Pat. No. 4,200,770 Hellman, Diffie
U.S. Pat. No. 4,218,582 M. E. Hellman and R. C. Merkle
U.S. Pat. No. 4,405,829 Rivest, Shamir, Adelman
U.S. Pat. No. 4,748,668 Shamir, Fiat.

What is claimed is:

1. A computer-based method for identifying, from content, additional information defining or describing a message encoded in said content, the method comprising:
receiving, in a machine, said content having said additional information encoded therein;
decoding, with said machine, said message from said content using at least one of a plurality of keys.

2. The method of claim 1 wherein said decoding comprises examining at least one subset of said content, said at least one subset consisting of less than all of said content.

3. The method of claim 1 wherein said decoding comprises advancing a sample window through a sample stream of said content.

4. The method of claim 1 wherein said decoding comprises transforming at least some of said content.

5. The method of claim 1 wherein said decoding comprises using at least two keys.

6. The method of claim 1 wherein said decoding comprises using at least two masks.

7. The method of claim 1 wherein said additional information is steganographically encoded in said content by a steganographic mapping process such that said decoding comprises a process for decoding from said content said additional information steganographically encoded in said content.

8. The method of claim 7 wherein said decoding comprises examining at least one subset of said content, said at least one subset consisting of less than all of said content.

9. The method of claim 7 wherein said decoding comprises advancing a sample window through a sample stream of said content.

10. The method of claim 7 wherein said decoding comprises transforming at least some of said content.

11. The method of claim 7 wherein said decoding comprises using at least two keys.

12. The method of claim 7 wherein said decoding comprises using at least two masks.

13. The method of claim 1 wherein said decoding further comprises determining a start of message marker, and wherein said determining said start of message marker comprises:
performing, in said machine, a transform on a first subset of said content, said first subset at a first location in said content, wherein said first subset does not include all of said content, to obtain a transformed first subset;
comparing, in said machine, said transformed first subset with said start of message marker, thereby determining whether said first location identifies said start of message marker location.

14. A method of claim 1 wherein said decoding further comprises:
comparing, in said machine, a first subset of said content at a first location in said content, wherein said first subset does not include all of said content, with a start of message marker, thereby determining whether said first location identifies said start of message marker location;
in response to said machine determining that said first location identifies said start of message marker location, executing an additional information identification algorithm to identify said additional information by using said start of message marker location to determine where in said content to begin examining said content for said additional information.

15. A method of claim 1 wherein said decoding further comprises:
acquiring said at least one of a plurality of keys to be used for decoding;
using a steganographic cipher process to locate the additional information by using the at least one of the acquired keys;
using the steganographic cipher process to extract the located additional information from the content.

16. A machine implemented method for identifying, in content containing additional information defining or describing a message, said message, comprising:
receiving, in said machine, said content, wherein said content contains encoded therein additional information defining or describing said message;
performing, with said machine, a transform on a first subset of said content, said first subset at a first location in said content, wherein said first subset does not include all of said content, to obtain a transformed first subset;
comparing, with said machine, said transformed first subset with said start of message marker, thereby determining whether said first location identifies a start of message marker location; and
decoding, with said machine, using said start of message marker location, said message.

17. The method of claim 16, further comprising:
in response to said machine determining that said first location does not identify said start of message marker location, said machine performing said transform on a second subset of said content, wherein said second subset does not include all of said content, to obtain a transformed second subset; and
comparing said transformed second subset with said start of message marker, thereby determining whether said second location identifies said start of message marker location.

18. The method of claim 17 wherein said content is represented as an ordered sequence of data, and a lowest sequence value of said second subset is one greater than a lowest sequence value of said first subset.

19. The method of claim 16 for identifying, in said content, additional information, further comprising:
in response to said machine determining that said first location identifies said start of message marker location, executing an additional information identification algorithm which uses said start of message marker location to determine where in said content to begin examining said content for said additional information.

20. The method of claim 19, wherein said executing said additional information identification algorithm comprises said machine sequentially applying a decode algorithm to different windows of said content, wherein each one of said different windows does not include all of said content.

21. The method of claim 20, wherein said executing said additional information identification algorithm comprises further comprises storing bits obtained by said sequentially applying said decode algorithm, in a sequence defined by the sequence in which said bits were obtained.

22. The method of claim 20 wherein each one of said different windows defines different subsets of said content.

23. The method of claim 20 wherein each one of said different windows contains the same size subset of said content as any other one of said different windows.

24. The method of claim 20 wherein said content is represented in said machine as an ordered sequence of data, and wherein said step of sequentially applying said decode algorithm to different windows comprises sequentially applying said decode algorithm to different windows having contiguous sequences of values in said ordered sequence of data.

25. The method of claim 20 further comprising storing said content in said machine in non transient machine memory.

26. The method of claim 16
wherein said decoding comprises using at least one of a plurality of keys.

27. A method for identifying, in content, a message, comprising:
receiving, in said machine, said content, wherein said content contains encoded therein additional information defining or describing a message;
comparing, in said machine, a first subset of said content at a first location in said content, wherein said first subset does not include all of said content, with a start of message marker, thereby determining whether said first location identifies said start of message marker location;
in response to said machine determining that said first location identifies said start of message marker location, executing an additional information identification algorithm to identify said additional information by using said start of message marker location to determine where in said content to begin examining said content for said additional information; and decoding said message from said content using said machine and said start of message marker location.

28. The method of claim 27, wherein said executing said additional information identification algorithm comprises said machine sequentially applying a decode algorithm to different windows of said content, wherein each one of said different windows does not include all of said content.

29. The method of claim 28 wherein each one of said different windows defines different subsets of said content.

30. The method of claim 28 wherein each one of said different windows contains the same size subset of said content as any other one of said different windows.

31. The method of claim 28 wherein said content is represented in said machine as an ordered sequence of data, and wherein said step of sequentially applying said decode algorithm to different windows comprises sequentially applying said decode algorithm to different windows having contiguous sequences of values in said ordered sequence of data.

32. The method of claim 27 wherein said decoding comprises using at least one of a plurality of keys.

33. A method for identifying content with a machine configured to use a steganographic cipher process, said process using a steganographic technique of hiding additional information including a watermark in combination with a cryptographic technique of multiple keys, comprising the steps of:
said machine receiving content that has been steganographically encoded with additional information defining or describing a message for identifying the content, wherein the encoding is controlled using at least one of the multiple keys;
said machine acquiring at least one of the multiple keys to be used for decoding;
said machine using the steganographic cipher process to locate the additional information defining or describing said message by using the at least one of the acquired keys;
said machine using the steganographic cipher process to extract said message.

34. The method according to claim 33, wherein the additional information defines or describes a message that includes at least one selected from the group consisting of: the title of the encoded content, the artist of the encoded content, terms of distribution of the encoded content, rights ownership identification, authorship identification of the content, publication rights of the encoded content, ownership identification of the encoded content, and an audit trail of the encoded content.

35. The method according to claim 33, wherein the additional information defines or describes a message that includes at least one selected from the group consisting of: information for enabling use of the encoded content, meterware information for the use of the encoded content, pay-by-use information for the use of the encoded content, and payment information for access to the encoded content.

36. The method according to claim 33 wherein the additional information is encoded in at least two locations of the content; and the method further comprising the step of:
using said steganographic cipher process to locate and extract said additional information from at least one of the two locations of the content.

37. The method according to claim 33, wherein said additional information does not perceptibly affect the encoded content.

38. The method according to claim 37, wherein the encoded content comprises at least one selected from the following group consisting of: an analog waveform, a digital sample stream, and a compressed copy of the encoded content.

39. The method according to claim 33 wherein the watermark includes an encode hash of at least a portion of the content and wherein the method comprises the step of e) generating a decode hash of at least a portion of the content and
comparing said encode hash to said decode hash.

40. The method according to claim 33 wherein the watermark includes an encode hash of at least a portion of the content that contains the watermark, wherein the encode hash is insensitive to encoding the watermark into the content and further generating a decode hash of at least a portion of the content that contains the watermark and comparing said encode hash to said decode hash.

41. The method according to claim 33 wherein the additional information contains a signed or encrypted watermark that is insensitive to said steganographic encoding process.

42. The method of claim 33 wherein the locating comprises using at least one of a plurality of keys.

43. A machine for identifying, from content containing additional information, a message defined or described in said additional information, the machine comprising:
a receiver configured to receive in said machine, said content;
a memory configured to store said content;
a decoder configured to decode said message from said additional information in said content stored in said memory using at least one of a plurality of keys.

44. A machine for identifying, in content, a message, using a start of message marker location, comprising:
a receiver configured to receive in said machine, said content, wherein said content contains therein additional information defining or describing said message;
memory configured to store said content;
a transformer configured to transform a first subset of said content stored in said memory, said first subset at a first location in said content, wherein said first subset does not include all of said content, to obtain a transformed first subset;
a comparator configured to compare said transformed first subset with said start of message marker, thereby determining whether said first location identifies said start of message marker location; and
a decoder configured to decode said message using said start of message marker location.

45. The machine of claim 44 wherein said decoder is configured to decode said message using at least on of a plurality of keys.

46. The machine of claim 44 wherein both said processor and said comparator are configured to use a processor.

47. A machine for decoding a message defined or described in additional information of content, comprising:
a receiver configured to receive said content;
memory configured to store said content;
a comparator configured to compare a first subset of said content at a first location in said content, wherein said first subset does not include all of said content, with a start of message marker, thereby determining whether said first location identifies said start of message marker location;
an executor configured to, in response to said machine determining that said first location identify said start of message marker location, execute an additional information identification algorithm to identify said additional information by using said start of message marker location to determine where in said content to begin examining said content for said additional information; and a decoder configured to decode said message from said content.

48. The machine of claim 46 wherein said decoder is configured to decode said message from said additional information.

49. The machine of claim 46 further comprising a processor.

50. A machine for determining a message encoded in content with a steganographic cipher process, comprising:

a receiver configured to receive content that has been steganographically encoded with a message using at least one of multiple keys;

structure configured to acquire at least one of the multiple keys;

memory configured to store said content and said at least one of the multiple keys;

a locator configured to locate, using the steganographic cipher process, the additional information by using the at least one of the acquired keys;

an extractor configured to, using the steganographic cipher process, extract the message from the content; and a decoder configured to decode said message.

51. The machine of claim 50 wherein said extractor is configured to use one of a plurality of keys with said steganographic cipher process to extract the message.

52. The machine of claim 50 further comprising a processor.

53. A method for identifying content, comprising the steps of:

receiving encoded content that has been encoded using a mapping and at least one of multiple keys, with additional information defining or describing a message that identifies the content;

acquiring at least one of the multiple keys;

using the mapping and at least one of the acquired keys to locate in the encoded content the additional information; and extracting said message from the located additional information.

54. A machine for identifying content, comprising:

a receiver designed to receive encoded content that has been encoded, using a mapping and at least one of multiple keys, with a message that identifies the content;

structure designed to acquire at least one of the multiple keys;

a locator configured to locate, using the mapping and at least one of the acquired keys, location in the encoded content of the message; and an extractor designed to extract said message from the encoded content.

* * * * *

UNITED STATES PATENT AND TRADEMARK OFFICE
CERTIFICATE OF CORRECTION

| | | |
|---|---|---|
| PATENT NO. | : 8,549,305 B2 | Page 1 of 1 |
| APPLICATION NO. | : 12/913751 | |
| DATED | : October 1, 2013 | |
| INVENTOR(S) | : Moskowitz et al. | |

It is certified that error appears in the above-identified patent and that said Letters Patent is hereby corrected as shown below:

In the Claims

Column 24 lines 48-50 change:

"45. The machine of claim 44 wherein said decoder is configured to decode said message using at least on of a plurality of keys." to:
-- 45. The machine of claim 44 wherein said decoder is configured to decode said message using at least one of a plurality of keys. --

Column 25 lines 6-8 change:

"48. The machine of claim 46 wherein said decoder is configured to decode said message from said additional information." to:
-- 48. The machine of claim 47 wherein said decoder is configured to decode said message from said additional information. --

Column 25 lines 9-10 change:

"49. The machine of claim 46 further comprising a processor." to:
-- 49. The machine of claim 47 further comprising a processor. --

Signed and Sealed this
Nineteenth Day of November, 2013

Teresa Stanek Rea
*Deputy Director of the United States Patent and Trademark Office*